United States Patent
Omote et al.

(10) Patent No.: US 8,712,615 B2
(45) Date of Patent: Apr. 29, 2014

(54) ARTIFICIAL ENGINE SOUND CONTROL UNIT, APPROACHING VEHICLE AUDIBLE SYSTEM, AND ELECTRIC VEHICLE HAVING THEM

(75) Inventors: Asako Omote, Tokyo (JP); Mutsuo Sekiya, Tokyo (JP); Tatsuya Mitsugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 13/387,684

(22) PCT Filed: Dec. 28, 2010

(86) PCT No.: PCT/JP2010/073730
§ 371 (c)(1),
(2), (4) Date: Jan. 27, 2012

(87) PCT Pub. No.: WO2011/148534
PCT Pub. Date: Dec. 1, 2011

(65) Prior Publication Data
US 2012/0130580 A1    May 24, 2012

(30) Foreign Application Priority Data

May 26, 2010    (JP) .................... PCT/JP2010/058901

(51) Int. Cl.
*B60L 9/00*     (2006.01)
*B60L 11/00*    (2006.01)
*G05D 1/00*     (2006.01)
*G05D 3/00*     (2006.01)
*G06F 7/00*     (2006.01)
*G06F 17/00*    (2006.01)

(52) U.S. Cl.
USPC .............................................. 701/22; 701/36

(58) Field of Classification Search
USPC ......... 701/22, 36, 99; 180/65.1, 65.21, 65.22, 180/65.265, 65.27, 65.275; 903/902, 903, 903/904
See application file for complete search history.

(56) References Cited

U.S. PATENT DOCUMENTS

| | | | |
|---|---|---|---|
| 4,325,199 A * | 4/1982 | McEdwards | 446/130 |
| 5,635,903 A * | 6/1997 | Koike et al. | 340/441 |
| 2007/0182525 A1* | 8/2007 | McCarthy et al. | 340/425.5 |

(Continued)

FOREIGN PATENT DOCUMENTS

| | | |
|---|---|---|
| DE | 10 2007 003 201 A1 | 5/2008 |
| JP | 61-39649 U | 3/1986 |
| JP | 7-32948 A | 2/1995 |
| JP | 11-208307 A | 8/1999 |
| JP | 2005-343360 A | 12/2005 |

(Continued)

*Primary Examiner* — Rami Khatib

(74) *Attorney, Agent, or Firm* — Birch, Stewart, Kolasch & Birch, LLP

(57) ABSTRACT

An artificial engine sound control unit which controls an artificial engine sound which is emitted from a sounding body which is provided at an electric vehicle whose at least a part of drive power is generated by an electric motor, to outside; comprising a speed region determination part which determines a speed region of the electric vehicle and an artificial engine sound generating part, when the speed region determination part determines such that the electric motor of the electric vehicle can be energized and the electric vehicle is stopped, the artificial engine sound generating part controls so as for the sounding body to emit an artificial engine sound, and the artificial engine sound generating part detects such that the electric vehicle comes close to a start running mode, then the artificial engine sound generating part controls the artificial engine sound which is emitted from the sounding body.

17 Claims, 23 Drawing Sheets

(56) References Cited

U.S. PATENT DOCUMENTS

| | | | | |
|---|---|---|---|---|
| 2007/0257783 | A1* | 11/2007 | Matsumoto et al. | 340/425.5 |
| 2011/0010269 | A1* | 1/2011 | Ballard | 705/26.41 |
| 2011/0093149 | A1* | 4/2011 | Tanaka | 701/22 |
| 2011/0188663 | A1* | 8/2011 | Nakayama | 381/57 |

FOREIGN PATENT DOCUMENTS

| | | |
|---|---|---|
| JP | 2006-199106 A | 8/2006 |
| JP | 2007-38937 A | 2/2007 |
| JP | 2008-195137 A | 8/2008 |
| JP | 2009-40318 A | 2/2009 |

* cited by examiner

| ELAPSED TIME IN INDIVIDUAL REGIONS [SEC] | AMOUNT OF VOLUME CHANGE Pt[dB] | |
|---|---|---|
| | a:KEY-ON REGION | b:KEY-ON STOP REGION |
| 0 | + 3 | -6 |
| 1 | + 3 | |
| 2 | + 2 | |
| 3 | + 2 | |
| 4 | + 1 | |
| 5 | +/- 0 | |
| ⋮ | ⋮ | ⋮ |

| PRESENCE OF AN OBSTACLE [SEC] | AMOUNT OF VOLUME CHANGE Pext1[dB] | OBSTACLE DISTANCE [m] | AMOUNT OF VOLUME CHANGE Pext2[dB] | LEVEL OF NOISE IN THE VICINITY [dB] | AMOUNT OF VOLUME CHANGE Pext3[dB] |
|---|---|---|---|---|---|
| 1 | +/- 0 | 0.5 | + 3 | 0-40 | - 3 |
| 2 | +/- 0 | 1 | + 2 | 40-50 | - 1 |
| 3 | + 1 | 2 | + 1 | 50-60 | +/- 0 |
| 4 | + 2 | 3 | + 1 | 60-70 | + 1 |
| ⋮ | ⋮ | ⋮ | ⋮ | ⋮ | ⋮ |

| PARKING BRAKE | AMOUNT OF VOLUME CHANGE Pext4[dB] | FOOT BREKE | AMOUNT OF VOLUME CHANGE Pext5[dB] | GEAR | AMOUNT OF VOLUME CHANGE Pext6[dB] | ACCELERATOR PEDAL OPERATION | AMOUNT OF VOLUME CHANGE Pext7[dB] |
|---|---|---|---|---|---|---|---|
| ON | -3 | ON | -2 | PARKING | -3 | OFF | +/- 0 |
| OFF | +/- 0 | OFF | +/- 0 | NEUTRAL | -2 | GENTLE ACCELERATION | +2 |
| — | — | — | — | DRIVE | +/- 0 | SUDDEN ACCELERATION | +3 |

| PRESENCE OF AN OBSTACLE [SEC] | AMOUNT OF FREQUENCY CHANGE Fext1[Hz] | LEVEL OF NOISE IN THE VICINITY [dB] | AMOUNT OF FREQUENCY CHANGE Fext2[Hz] | FREQUENCY BAND OF NOISE IN THE VICINITY [Hz] | AMOUNT OF FREQUENCY CHANGE Fext3[Hz] |
|---|---|---|---|---|---|
| 1 | +/- 0 | 0 - 40 | +/- 0 | 0 - 50 | + 50 |
| 2 | +/- 0 | 40 - 50 | +/- 0 | 50 - 100 | + 100 |
| 3 | + 200 | 50 - 60 | + 400 | 100 - 200 | + 200 |
| 4 | + 300 | 60 - 70 | + 600 | 200 - 300 | + 300 |
| ⋮ | ⋮ | ⋮ | ⋮ | ⋮ | ⋮ |

FIG. 14

| PARKING BRAKE | AMOUNT OF FREQUENCY CHANGE Fext4[Hz] | FOOT BREKE | AMOUNT OF FREQUENCY CHANGE Fext5[Hz] | GEAR | AMOUNT OF FREQUENCY CHANGE Fext6[Hz] |
|---|---|---|---|---|---|
| ON | - 200 | ON | - 100 | PARKING | - 200 |
| OFF | +/- 0 | OFF | +/- 0 | NEUTRAL | - 100 |
| - | - | - | - | DRIVE etc. | +/- 0 |

FIG. 15

| VEHICLE SPEED [km/h] | AMOUNT OF FRWQUENCY CHANGE Fv[Hz] |
|---|---|
| 0 | +/- 0 |
| 1 | + 0.25 |
| 2 | + 0.5 |
| 3 | + 0.75 |
| ⋮ | ⋮ |
| Y - 1 | + 79.75 |
| Y | + 80 |

| BRAKE PEDAL POSITION [%] | AMOUNT OF FREQUENCY CHANGE Fext4[Hz] |
|---|---|
| 0 - 25 | - 25 |
| 25 - 50 | - 50 |
| 50 - 75 | - 75 |
| 75 - 100 | - 100 |

| VEHICLE SPEED [km/h] | REFERENCE VOLUME Pb[dB] |
|---|---|
| 0 | 40 |
| 1 | 42 |
| 2 | 44 |
| 3 | 46 |
| ⋮ | ⋮ |
| X-1 | 56 |
| X | 58 |
| X+1 | 59 |
| ⋮ | ⋮ |
| Y-1 | 60 |
| Y | 60 |

| ELAPSED TIME IN INDIVIDUAL REGIONS [SEC] | AMOUNT OF VOLUME CHANGE Pt[dB] | | | | |
|---|---|---|---|---|---|
| | a:KEY-ON REGION | b:KEY-ON STOP REGION | c:START REGION | d:ACCELERATION REGION | e:SATURATION REGION |
| 0 | +3 | -6 | +5 | +/- 0 | +/- 0 |
| 1 | +3 | | +5 | | |
| 2 | +2 | | +4 | | |
| 3 | +2 | | +3 | | |
| 4 | +1 | | +2 | | |
| 5 | +/- 0 | | +1 | | |
| ... | ... | ... | ... | ... | ... |

FIG. 25

| BRAKE PEDAL POSITION [%] | AMOUNT OF VOLUME CHANGE Pext5[dB] |
|---|---|
| 0 - 25 | - 0.5 |
| 25 - 50 | - 1 |
| 50 - 75 | - 1.5 |
| 75 - 100 | - 2 |

| VEHICLE SPEED [km/h] | AMOUNT OF FREQUENCY CHANGE Fv[Hz] | | |
|---|---|---|---|
| | SPECIFIC FREQUENCY SOUND DATA 1 | SPECIFIC FREQUENCY SOUND DATA 2 | SPECIFIC FREQUENCY SOUND DATA 3 |
| 0 | +/- 0 | +/- 0 | +/- 0 |
| 1 | + 0.25 | + 0.5 | + 1 |
| 2 | + 0.5 | + 1 | + 2 |
| 3 | + 0.75 | + 1.5 | + 3 |
| ⋮ | ⋮ | ⋮ | ⋮ |
| Y-1 | + 79.75 | + 159.5 | + 319 |
| Y | + 80 | + 160 | + 320 |

ARTIFICIAL ENGINE SOUND CONTROL UNIT, APPROACHING VEHICLE AUDIBLE SYSTEM, AND ELECTRIC VEHICLE HAVING THEM

TECHNICAL FIELD

This invention relates to an artificial engine sound control unit which controls the artificial engine sound for making pedestrians, etc. perceive the existence of electric vehicles which are excellent in quietness such as a hybrid car, an electric vehicle, etc.

BACKGROUND ART

Recently, following development and practical realization of electric bicycles, electric carts, vehicles as various kinds of vehicle such as electric motorcycles, electric cars, etc. have become electrically motorized. Specifically, instead of cars which are powered by an internal combustion engine, hybrid cars which are powered by a gasoline engine and an electric motor; electric cars which are powered by an electric motor which is operated by a battery which is charged with household electric power supply or a charger which is provided at a gas station or an electric power supply station; or fuel cell cars which are powered by a fuel cell using hydrogen gas, etc. as fuel are developed in succession. Regarding the hybrid cars and the electric cars, a part of them are already practically used and are about to become widely used.

Conventional vehicles which are powered by an internal combustion engine such as a gasoline-powered car, a diesel powered car or a bike (hereinafter described as conventional car) generate an engine sound or an exhaust sound which is emitted from a power source itself and further generate a road noise, etc. while running. Therefore, pedestrians walking in the street or persons who get on a bicycle can perceive the approaching of a vehicle by an engine sound or an exhaust sound. However, in a case of hybrid cars, when the hybrid cars run at a low speed, they are not powered by an engine but mainly by an electric motor. Therefore, the engine sound or the exhaust sound is not generated. Further, in a case of electric cars or fuel cell cars, etc. they are driven by an electric motor in whole operation region. Therefore, the above-mentioned vehicles are electric vehicles that are excellent in quietness. However, pedestrians or persons who get on a bicycle in the vicinity of the electric vehicles which are excellent in quietness can not perceive the approaching of the electric vehicles such as a hybrid car powered by an electric motor which generates less sound and is excellent in quietness, an electric car, or a fuel cell car by sound. Consequently, accidental contact between the electric vehicles which are excellent in quietness and pedestrians, etc. may occur.

As above-mentioned, excellent quietness of hybrid cars, fuel cell cars, electric cars, etc. is advantage, however, the excellent quietness may sometimes be adverse effect. In order to solve the above-mentioned problem, in addition to a horn which is tooted by drivers of their own will so as to alert persons in the vicinity, various kinds of systems to notify the presence of the vehicle to the persons in the vicinity, without relation to intention of drivers of the vehicle, have been proposed.

For example, according to Patent Document 1, when a vehicle is started, a warning sound is generated, and the magnitude of the warning sound is changed to be high for the first 5 seconds, and then, lower. The warning sound on the low sound level is continued before the vehicle speed exceeds 10 km/h. In this case, the magnitude of the warning sound is gradually reduced as the time is elapsed, the volume of the warning sound is alternatively changed to be higher or lower, or the magnitude of the warning sound is changed according to the change of the vehicle speed.

According to Patent Document 2, an artificial engine sound signal having a frequency corresponding to the motor rotation number and an amplitude corresponding to an accelerator pedal position; and an artificial engine sound signal having a frequency corresponding to a vehicle speed which is detected by a vehicle speed sensor and an amplitude corresponding to the accelerator pedal position; are produced by a computer, and are output from a speaker through an amplifier. And it is selected by a switch such that whether the artificial engine sound depending on the motor rotation number is made, or the artificial engine sound depending on the vehicle speed is made. Further, it is mentioned such that an artificial engine sound including the frequency depending on the motor rotation number and the frequency depending on the car speed may be emitted

PRIOR ART REFERENCE

Patent Document

Patent Document 1: Japanese Patent Application Laid-Open No. 2005-343360

Patent Document 2: Japanese Patent Application Laid-Open No. 7-32948

DISCLOSURE OF THE INVENTION

Problems to be Solved by the Invention

The above-mentioned conventional warning sound generating devices and approaching vehicle audible systems have the following problems. In order to avoid the danger, pedestrians in the vicinity of a vehicle have to determine whether the vehicle which is stopped is the start-able state or not. However, according to the Patent Document 1, a vehicle generates an artificial engine sound after the vehicle starts to run, therefore, the generated artificial engine sound may astonish pedestrians in the vicinity of the vehicle, so the generated artificial engine sound may rather bring danger. Further, if the magnitude of the artificial engine sound for the first 5 seconds after a vehicle starts to run is reduced while the vehicle is driven at a low speed, it becomes difficult for pedestrians to perceive the approaching of vehicle which is driven at a low speed. Consequently, reducing the magnitude of the artificial engine sound while the vehicle is driven at a low speed may bring danger to pedestrians.

According to Patent Document 2, an objective of the invention is to generate a warning sound corresponding to the motor rotation number or an accelerator pedal position. The Patent Document neither discloses nor suggests anything regarding the generating of artificial engine sound when a vehicle is parked.

When conventional cars are stopped with leaving an engine running, pedestrians unconsciously pass through avoiding the stopped car. However, electric vehicles such as an electric car are silent state before the electric vehicles are started to run and motors are started. Consequently, regarding the stopped electric vehicles, pedestrians can not avoid the danger voluntarily.

In order to solve the problems of the above-mentioned conventional approaching vehicle audible systems, the present invention is made. An objective of the present invention is to provide electric vehicles whose presence can be perceived by pedestrians, and the pedestrians can avoid the danger voluntarily even the electric vehicles are stop-state.

Means for Solving the Problems

This invention relates to an artificial engine sound control unit which controls an artificial engine sound which is emitted from a sounding body, which is provided at an electric vehicle whose at least a part of drive power is generated by an electric motor, to outside;

comprising a speed region determination part which determines a speed region of an electric vehicle and an artificial engine sound generating part, when the speed region determination part determines such that an electric motor of the electric vehicle can be energized and the electric vehicle is stopped, the artificial engine sound generating part controls so as for the sounding body to emit an artificial engine sound, and the artificial engine sound generating part detects such that the electric vehicle comes close to a start running mode and controls the artificial engine sound which is emitted from the sounding body.

Advantage of the Invention

According to this invention, when an electric vehicle is stopped, the sound is generated in the same way as that of conventional cars, by controlling the sound, when the electric vehicle which is stopped come close to the start running mode, pedestrians can voluntarily take risk adverse action.

BRIEF DESCRIPTION OF THE DRAWINGS

FIG. 10 is a table showing an example of a table of volume versus external information with respect to a volume modification part according to Embodiment 2 of the present invention;

FIG. 11 is a table showing another example of a table of volume versus external information with respect to a volume modification part according to Embodiment 2 of the present invention;

FIG. 14 is a table showing an example of a table of sound quality versus external information with respect to a sound quality modification part according to Embodiment 3 of the present invention;

FIG. 15 is a table showing another example of a table of sound quality versus external information with respect to a sound quality modification part according to Embodiment 3 of the present invention;

FIG. 25 is a table showing an example of a table of volume versus time with respect to a volume modification part according to Embodiment 4 of the present invention;

EMBODIMENTS FOR CARRYING OUT THE INVENTION

Embodiment 1

Figure 1:
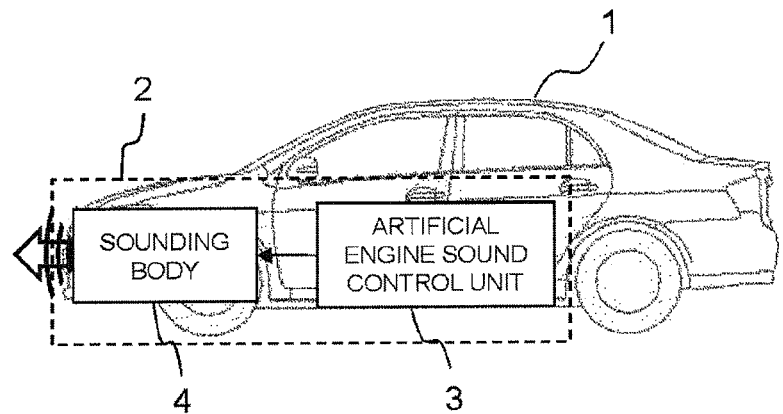
FIG. 1 is a conceptual diagram showing the configuration of an electric vehicle having an artificial engine sound control unit according to the present invention.
Figure 2:
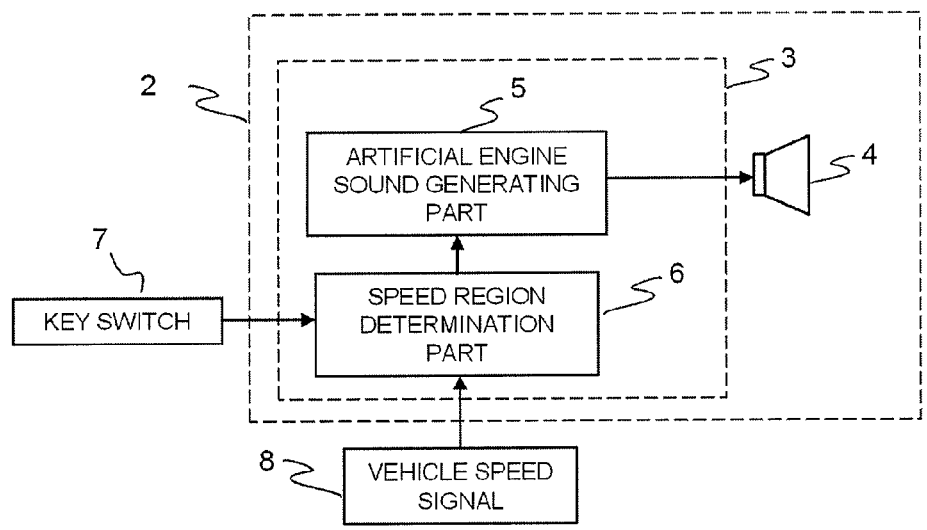
FIG. 2 is a block diagram showing the configuration of a main part of an artificial engine sound control unit according to Embodiment 1 of the present invention.

FIG. 1 is a conceptual diagram showing the configuration of an electric vehicle having an artificial engine sound control unit according to the present invention; and FIG. 2 is a block diagram showing the configuration of a main part of an artificial engine sound control unit according to Embodiment 1 of the present invention. In FIG. 1 and FIG. 2, the numeral 1 indicates an electric vehicle whose partial or whole driving power is generated electrically by an electric motor such as an electric car and a hybrid car; and the numeral 2 indicates an approaching vehicle audible system which is equipped with the electric vehicle 1. The approaching vehicle audible system 2 comprises an artificial engine sound control unit 3 and a sounding body 4 such as a speaker, etc. for emitting an artificial engine sound to the outside of the electric vehicle 1. The artificial engine sound control unit 3 comprises an artificial engine sound generating part 5 and a speed region determination part 6 for determining a speed region of an electric vehicle. The numeral 7 indicates a key switch which is equipped with the electric vehicle 1 for a driver to start the electric vehicle, and the key switch outputs the signal of ON and OFF. In a case where the operation of "ROCK", "ACC", "ON", or "START", etc. is necessary in the same way as that of conventional key switches, the key switch indicated by the numeral 7 corresponds to the state of "ON". Here, when the key switch of an electric vehicle is the ON state, preparation for operating a power unit system or an electric system of the electric vehicle is completed, that is, the state in which an electric motor can be energized. Hereinafter, in Embodiments, the state in which the key switch of an electric vehicle is ON means the state in which preparation for operating a power unit system or an electric system of the electric vehicle is completed. The numeral 8 indicates a vehicle speed signal which is equipped with the electric vehicle 1. The speed region determination part 6 inputs a signal of the key switch 7 which is equipped with the electric vehicle 1 and the vehicle speed signal 8 so as to determine a vehicle speed region of the electric vehicle 1.

Next, the operation will be described. In electric vehicles such as an electric car, etc., when drivers turn a key switch ON, preparation for operating a power unit system or an electric system is completed, but driving rotation devices such as a motor, etc. have not been rotated yet. Only after the drivers express their intentions to run the electric vehicles by an accelerator pedal, driving rotation devices are rotated, and then the electric vehicles start to run. However, in the present invention, even the electric vehicle 1 is not the run-state, when drivers turn the key switch 7 ON, that is, when the state corresponds to the idling of conventional cars, etc., the speed region determination part 6 outputs the information indicating that the electric vehicle 1 is the idling state to the artificial engine sound generating part 5. When the information indicating that the electric vehicle 1 is the idling state is inputted to the artificial engine sound generating part 5, a signal of an artificial engine sound is generated and an artificial engine sound is generated in the sounding body 4. An artificial engine sound is a sound which is generated by electric vehicles so as to inform pedestrians, etc. such that the state of the electric vehicles is same as that of vehicles obtaining a motive power only from an engine. It is preferable that tone of an artificial engine sound is similar to that of the sound which is generated by vehicles obtaining a motive power only from an engine, however, tone which is not similar to that of the sound which is generated by vehicles obtaining a motive power only from an engine may be acceptable.

As above-mentioned, the artificial engine sound control unit 3 in Embodiment 1 of the present invention is characterized such that an artificial engine sound is generated when a driver makes preparation for starting to run the electric vehicle 1 which is stopped, that is, in the state corresponding to the idling of conventional cars, etc. In conventional electric vehicles, an artificial engine sound is generated while the electric vehicles are running. Consequently, persons in the vicinity of the electric vehicles such as a pedestrian, etc. suddenly perceive the presence of the electric vehicles when the electric vehicles start to run. As a result, it is possible such that accidental contact between the electric vehicles and persons in the vicinity of the electric vehicles may occur due to the delay of risk adverse action. On the other hand, according to the artificial engine sound control unit 3 in Embodiment 1 of the present invention, an artificial engine sound is generated when the electric vehicle 1 is the stop state, and is in the state where the electric vehicle 1 enters the stage of preparation for running. Consequently, persons in the vicinity of the electric vehicle 1 such as a pedestrian, etc. can perceive the presence of the electric vehicle 1 before the electric vehicle starts to run. As a result, they can take risk adverse action. That is, the present invention can provide a safer electric vehicle.

Embodiment 2

Figure 3:
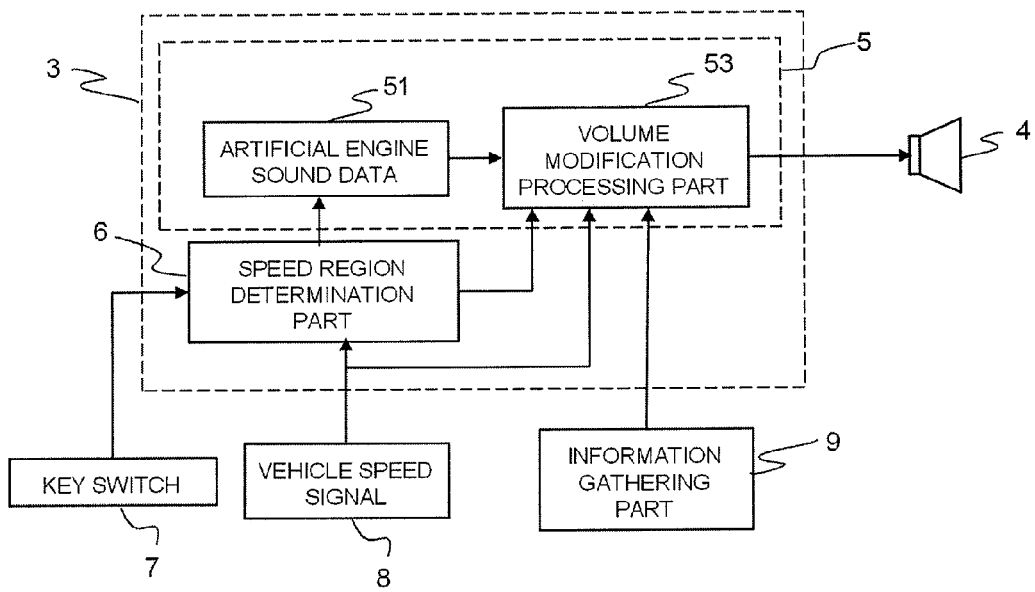
FIG. 3 is a block diagram showing the configuration of a main part of an artificial engine sound control unit according to Embodiment 2 of the present invention.

FIG. 3 is a block diagram showing the configuration of a main part of an artificial engine sound control unit according to Embodiment 2 of the present invention. In FIG. 3, the symbol which is same as that in FIG. 2 indicates the same part or the corresponding part. An artificial engine sound generating part 5 of an artificial engine sound control unit in Embodiment 2 comprises an artificial engine sound data 51 and a volume modification processing part 53 which changes the volume of a sound which is generated in the artificial engine sound data 51.

Further, the volume modification processing part 53 in the artificial engine sound generating part 5 inputs signals from an information gathering part 9, such as a microphone, a camera and a sensor which are mounted to outside of a vehicle, and an in-vehicle equipment including a damping brake (foot brake) signal, a parking brake signal, a gear position signal and an accelerator pedal position signal. The information gathering part obtains noise information of vehicle external environment, information indicating the presence or absence of obstacles including pedestrians, bicycles, bikes, etc., information indicating the distance to the obstacles, information indicating the presence time of the obstacles, and information indicating the state of in-vehicle equipment including a foot brake, a parking brake, a gear, an accelerator, etc., and outputs the obtained information to the volume modification processing part 53.

Next, the operation will be described. The artificial engine sound data 51 is a sound data for generating a sound that evokes the running of vehicles. The key switch 7 is a start key of electric vehicles, and outputs a signal of ON and OFF of the switch to a speed region determination part 6. A vehicle speed signal 8 obtains a vehicle speed signal and outputs the obtained vehicle speed signal to the speed region determination part 6 and the volume modification processing part 53. On this occasion, acceleration may be outputted based on the change amount of the vehicle speed signal.

Figure 4:
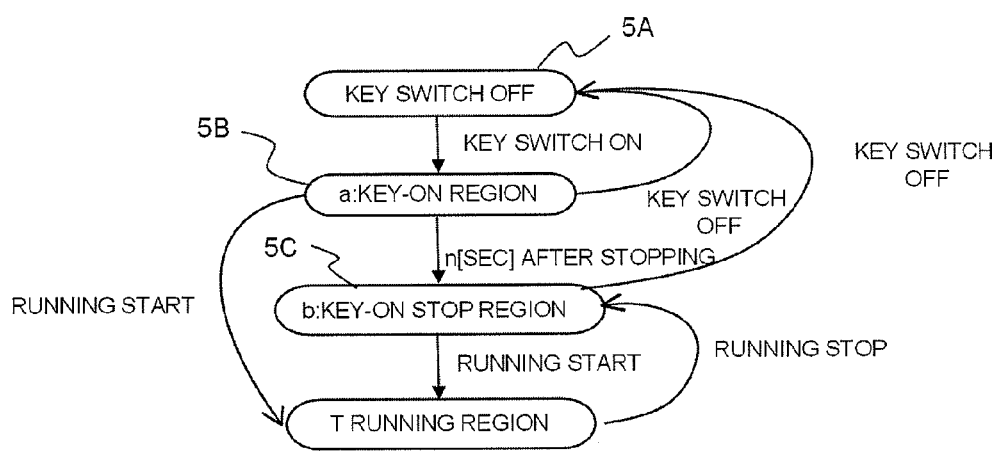
FIG. 4 is a diagram showing an example of state transitions of speed regions according to Embodiment 2 of the present invention.

The speed region determination part 6 divides the speed region, in which the speed is reached to a predetermined speed from the state of 0 (zero) of vehicle speed when a vehicle is stopped, into two or more parts based on the information which is obtained by the key switch 7 and the vehicle speed signal 8, and determines such that the state of the electric vehicle as of now is which speed region. FIG. 4 shows an example of a state transition of speed regions when the speed region is divided into two stop-state regions and a running region. The speed region determination part 6 divides the speed region of an electric vehicle into two stop-state regions, that is, a:key-on region (5B) and b:key-on stop region (5C), and a running region, and determines such that the state of the electric vehicle as of now is which region. Further, here, the a:key-on region (5B) is a range in which a predetermined time (n seconds) is elapsed immediately after the key-on with the stop state. Further, regarding the a:key-on region (5B), the a:key-on region (5B) in a case where an electric vehicle starts to run before a predetermined time (n seconds) is elapsed is a region from immediately after the key-on to start of running. Further, the b:key-on stop region is a range from immediately after the key-on region is elapsed to start of running.

Embodiment 2 is an embodiment regards to the generation of artificial engine sound in the state in which an electric vehicle is stopped, that is, in the a:key-on region and the b:key-on stop region among the above-mentioned speed regions. The a:key-on region (5B) is a speed region where immediately after the key switch 7 is turned ON. Regarding a vehicle driven by an engine, an idling sound is generated by turning a key-switch ON while the vehicle is parked. Under these conditions, pedestrians who approach the vehicle have a habit of avoiding the vehicle which is in the idling stop state. However, an electric vehicle driven by a motor does not generate an idling sound while the electric vehicle is stopped, therefore, the electric vehicle is silent. Under the above mentioned condition, pedestrians who approach the electric vehicle can not avoid the danger voluntarily, and the possibility of contact-dangerous degree becomes high at the time of start running of the electric vehicle. Consequently, this condition is extremely dangerous. In addition to that, it is also difficult for drivers to perceive intuitively such that the key switch 7 is turned ON or not because the idling sound can not be heard. In order to avoid the above-mentioned dangerous condition, in the a:key-on region (5B), an artificial idling sound is generated so as for persons in the vicinity of the electric vehicle to perceive the operation of the electric vehicle. The above-mentioned is the operation which is the same as that is described in Embodiment 1.

In a case where the idling state lasts for a long period, the nuisance of noise pollution for other pedestrians in the vicinity and residents living in the vicinity can be eliminated without bringing a danger to target pedestrians to be informed by providing a speed region (b:key-on stop region (5C)) in which a volume level is decreased after a predetermined time is elapsed. It is preferable such that the volume of the artificial idling sound is lower than that of the artificial engine sound at the time of start running in order to eliminate the nuisance of noise pollution while idling.

Figure 5:
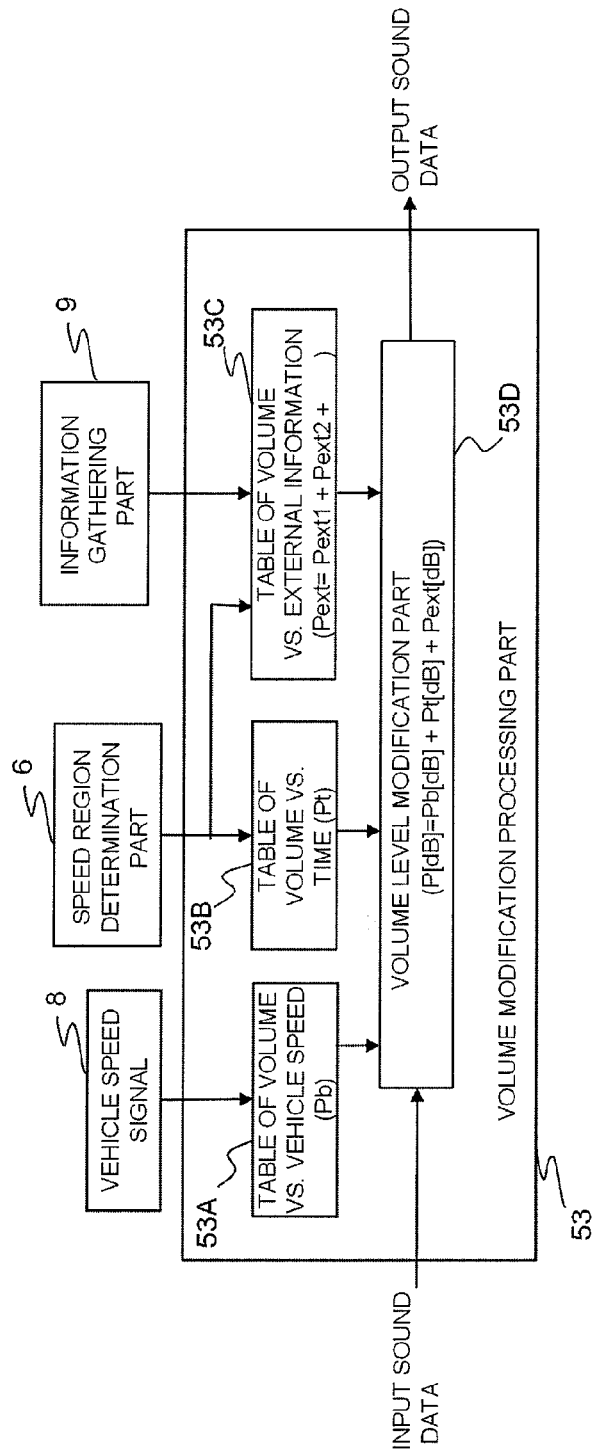
FIG. 5 is a block diagram showing the configuration of a volume modification part of an artificial engine sound control unit according to Embodiment 2 of the present invention.

Next, the operation of the volume modification processing part 53 shown in FIG. 3 will be described. The details of the volume modification processing part 53 are shown in FIG. 5. The volume modification processing part 53 comprises a table 53A of volume versus vehicle speed, a table 53B of volume versus time, a table 53C of volume versus external information, and a volume level modification part 53D. The volume modification processing part 53 controls the volume of an artificial engine sound to be different volumes for individual speed regions which are determined by the speed region determination part 6 based on the information obtained by the vehicle speed 8, the information gathering part 9 and the speed region determination part 6.

The table 53A of volume versus vehicle speed holds a table of a volume Pb[dB] which is a reference corresponding to the change of a vehicle speed. The table 53A of volume versus vehicle speed in EMBODIMENT 2 is a table in which the volume of an artificial engine sound which is inputted is a constant value and is not changed in the a:key-on region (5B) and the b:key-on stop region. Here, the constant value will be called as a reference volume.

Figures 6, 7:
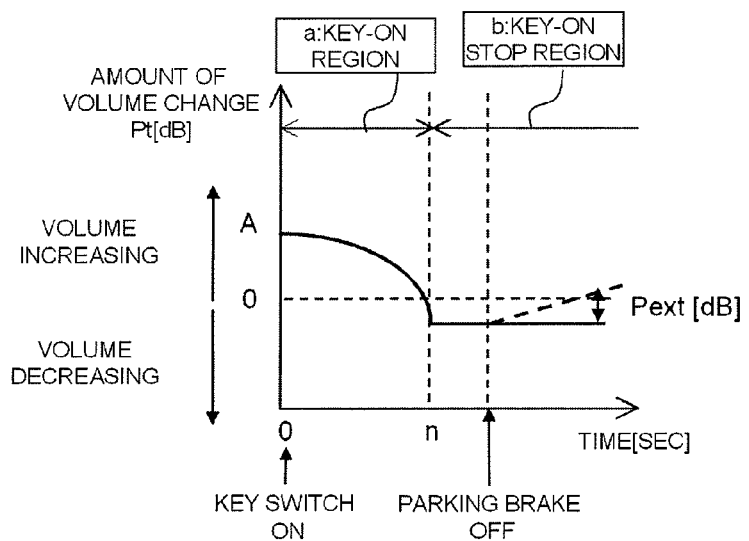
FIG. 6 is a table showing an example of a table of volume versus time with respect to a volume modification part according to Embodiment 2 of the present invention.
FIG. 7 is a diagrammatic view showing an example of the characteristic of a table of volume versus time with respect to a volume modification part according to Embodiment 2 of the present invention.
Figure 8:
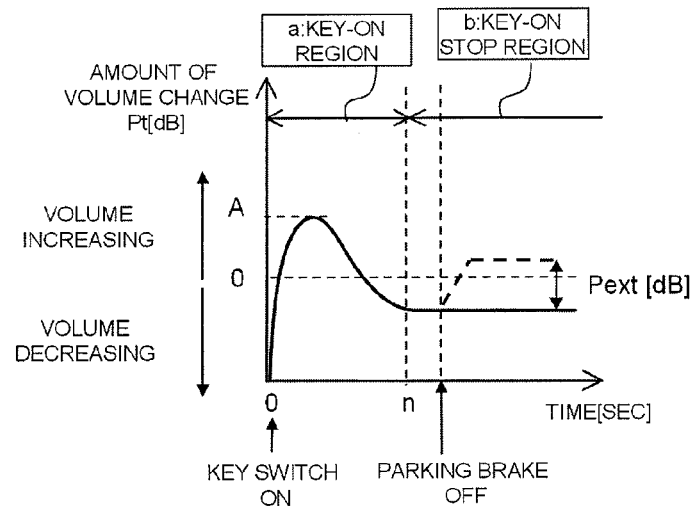
FIG. 8 is a diagrammatic view showing another example of the characteristic of a table of volume versus time with respect to a volume modification part according to Embodiment 2 of the present invention.
Figure 9:
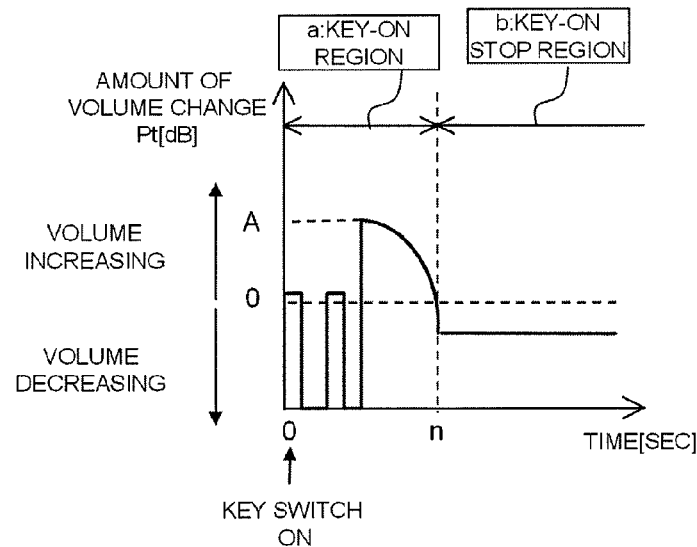
FIG. 9 is a diagrammatic view showing another example of the characteristic of a table of volume versus time with respect to a volume modification part according to Embodiment 2 of the present invention.

As shown in a table shown in FIG. 6, the table 53B of volume versus time holds a table of the amount of volume change Pt[dB] corresponding to the change of time for each a:key-on region (5B) and each b:key-on stop region. Here, the amount of volume change refers to the amount of change of a volume from the reference volume. That is, when the amount of volume change is positive, the volume is increased from the reference volume, and when the amount of volume change is negative, the volume is decreased from the reference volume. FIG. 7, FIG. 8 and FIG. 9 show the characteristic examples of the table 53B of volume versus time in the a:key-on region and the b:key-on stop region. In the a:key-on region, when the key switch 7 is turned ON, an idling sound is generated. It is necessary for pedestrians in the vicinity and drivers to recognize such that the key switch 7 is turned ON, that is, operation preparation for a power unit system or an electric system of the electric vehicle is completed. Therefore, as shown in the characteristic example of FIG. 7, it is preferable such that a volume of an artificial engine sound is made to be slightly larger than the reference volume (indicated by 0) in the a:key-on region. Further, there is the possibility such that pedestrians, etc. are surprised by the situation in which the artificial engine sound is suddenly generated. Therefore, the volume of the artificial engine sound may be increased gradually as shown in FIG. 8. Or, as shown in FIG. 9, an artificial engine sound having a small volume may be generated at the beginning, and then, an artificial engine sound having a large volume may be generated. In the b:key-on stop region, in order to avoid the noise pollution of the artificial engine sound while the electric vehicle is stopped, it is preferable such that the artificial engine sound has the characteristic in which the volume can be changed to be small.

The table 53C of volume versus external information holds the amount of volume change corresponding to noise information of vehicle external environment which is obtained by the information gathering part 9, information indicating the presence or absence of obstacles including pedestrians, bicycles, bikes, etc., information indicating the distance to the obstacles, and information indicating the presence time of the obstacles. For example, as shown in a table in FIG. 10, the table 53C of volume versus external information may hold the amount of volume change Pext1 with respect to the presence time of an obstacle, the amount of volume change Pext2 with respect to the distance to an obstacles, and the amount of volume change Pext3 with respect to the level of noise in the vicinity. By using the above-mentioned amount of volume change, in a case where pedestrians stay for a long time in the vicinity of an electric vehicle or in a case where the distance between pedestrians and an electric vehicle is short, it is easier for pedestrians to perceive the presence of the electric vehicle. On the contrary, when it is determined such that pedestrians perceive the presence of an electric vehicle, the volume may be decreased so as not to cause discomfort for others in the vicinity. For example, when a driver notices such that the driver is looked at by a pedestrian, it is clear such that the pedestrian perceives the presence of the driver's vehicle. Under these conditions, the volume may be decreased by a manual switch, or the frequency may be changed so as not to be disagreeable to the ear. In order to automatically detect pedestrians, a detection function of persons may be provided in the information gathering part 9. This function can be realized by known technology such as a camera, radar or an ultrasonic sensor. In a case where pedestrians are automatically detected, there is an advantage such that pedestrians who are not perceived by drivers can be detected.

The table 53C of volume versus external information may hold the volume amount corresponding to the information indicating the state of a damping brake (foot brake), a parking brake, a gear or an accelerator which is obtained by the information gathering part 9. For example, in a case where a speed region is the a:key-on region and the b:key-on stop region, as shown in a table in FIG. 11, the table 53C of volume versus external information may hold the amount of volume change Pext4 with respect to the state of a parking brake, the amount of volume change Pext5 with respect to the state of a foot brake, the amount of volume change Pext6 with respect to the state of a gear and the amount of volume change Pext7 with respect to an accelerator pedal position. Here, in the a:key-on region and the b:key-on stop region, by increasing the amount of volume change Pext7 corresponding to the operation of accelerator pedal, sudden starting of an electric vehicle can be informed to pedestrians in the vicinity. In addition to that, as the amount of stepping on the accelerator pedal from the slope way like hill start at startup can be sensuously grasped by drivers, there is the synergetic effect such that it is easier for drivers to know the release timing of the parking brake. Further, in a case where the operation of an accelerator pedal is gently performed, the volume may be increased to the Pext7 in proportion to the operation speed of an accelerator pedal, or assuming the case in which an accelerator pedal is suddenly operated, the volume may be increased to Pext7 in proportion to the acceleration of the operation of an accelerator pedal. Further, a value which is held by the table 53C of volume versus external information may be the amount of volume change with respect to other external information. Further, the amount of volume change may be held for individual seed regions. Individual parameters indicated by Pext may have correlations each other or may be treated as an independent parameter. That is, as an example in which individual parameters are related each other, in a case where the volume is increased corresponding to the vehicle speed, the degree in which the volume is increased may be increased by multiplying the relationship between other parameter and the volume by a coefficient which is more than one. On the contrary, in a case where the volume is decreased corresponding to the vehicle speed, the degree in which the volume is decreased may be increased by multiplying the relationship between other parameter and the volume by a coefficient which is less than one. Further, numeral values shown in FIG. 10 and FIG. 11 are example, and numeral values are not limited to these.

Further, by the above-mentioned operation, as indicated by a broken line in FIG. 7 and FIG. 8, when the parking brake is changed to the OFF state, the state in which an electric vehicle comes close to a start running mode is detected, and then, in order to increase the volume so as to call attention to pedestrians, etc. in the vicinity, the modification such as increasing the volume at the time when a parking brake is turned OFF can be performed. In a case where the state in which an electric vehicle comes close to a start running mode is detected, by adjusting the sound such as making the silent state for a predetermined time in addition to adjusting the level of the volume which is generated by a sounding body 3, operation for seeking attention may be performed by informing persons, etc. in the vicinity such that the electric vehicle comes close to a start running mode. For example, when a key switch is ON-state and the speed region determination part determines such that the electric vehicle is stopped, in a device in which a sound is emitted, the state in which the vehicle comes close to a start running mode is detected, and the silent state is made for a predetermined time, and after that the sound may be emitted again. By doing the above-mentioned operation, it can make a clear appeal such that the vehicle comes close to a start running mode to persons, etc. in the vicinity. Certainly, the modification of the sound of this operation is not limited to making the silent state for a predetermined time but can include various kinds of means such as modification of the degree of the sound or generating the sound utilizing resonance phenomenon.

Further, the state in which an electric vehicle comes close to a start running mode can be detected by the information indicating the state of a damping brake (foot brake), a parking brake, a gear, or an accelerator which is obtained by the information gathering part 9. For example, the state in which an electric vehicle comes close to a start running mode can be detected not only by the above-mentioned parking brake state but also by the state in which brake (both of the foot brake and the parking brake, or either of them) is changed from the ON-state to the OFF-state. Or the state in which a vehicle comes close to a start running mode may be detected by the state in which a key switch is switched from an accessory position to an ignition (capable of driving a motor) position, the state in which a position of a gear is changed, or the state in which an accelerator pedal is pressed on in the state of capable of driving a motor.

For example, as an example of the state in which a vehicle comes close to a start running mode is detected by the state in which a position of a gear is changed, the examples in which the mode is detected by the following events can be conceived. In an electric vehicle having an automatic transmission, the state in which the electric vehicle comes close to a start running mode can be detected by the event in which the transmission is disengaged from a parking gear. Further in an electric vehicle having a manual transmission, the state in which the electric vehicle comes close to a start running mode can be detected by the event in which the transmission is disengaged from a neutral gear. That is, the state in which the electric vehicle comes close to a start running mode may be detected by the event in which the gear which does not transmit power of the electric vehicle is disengaged from the gear which does not transmit power.

Further, in an electric vehicle having an automatic transmission, the state in which the electric vehicle comes close to a start running mode can be detected by the event in which a parking gear is changed to other gear such as a drive gear or a reverse gear. Further, in an electric vehicle having a manual transmission, the state in which the electric vehicle comes close to a start running mode can be detected by the event in which the neutral gear-state is changed to be other gear such as a first speed drive gear or a reverse gear. That is, the state in which the electric vehicle comes close to a start running mode may be detected by the event in which the gear which does not transmit power of the electric vehicle is changed to be a gear which transmits power.

Further, as an example in which the state of an electric vehicle comes close to a start running mode is detected by the event in which an accelerator pedal is pressed on, the state in which the electric vehicle comes close to a start running mode is detected by an accelerator pedal position, that is, the event in which an accelerator is opened from an idling position. In the same way, the state in which the electric vehicle comes close to a start running mode can be detected by the state whether a current value or the change ratio of a driving current of a motor is equal to or greater than a predetermined value or not.

The volume modification part 53D adds the amount of a change of a volume Pt[dB] which is outputted from the table 53B of volume versus time and the amount of a change of a volume Pext[dB] which is outputted from the table 53C of volume versus external information to the reference volume Pb[dB] which is outputted from the table 53A of volume versus vehicle speed so as to make the volume P[dB] of the artificial engine sound to be outputted. The volume modification part 53D controls the level of an input sound data to be the volume P[dB]. By using the above-mentioned methods, the volume of the artificial engine sound can be adjusted corresponding to the stopping situation and the external information. Here, in order to make the silent state by detecting the state in which an electric vehicle comes close to a start running mode, the amount of volume change Pext[dB] may be adjusted so as for the volume P[dB] is 0 or lower.

Embodiment 3

Figure 12:
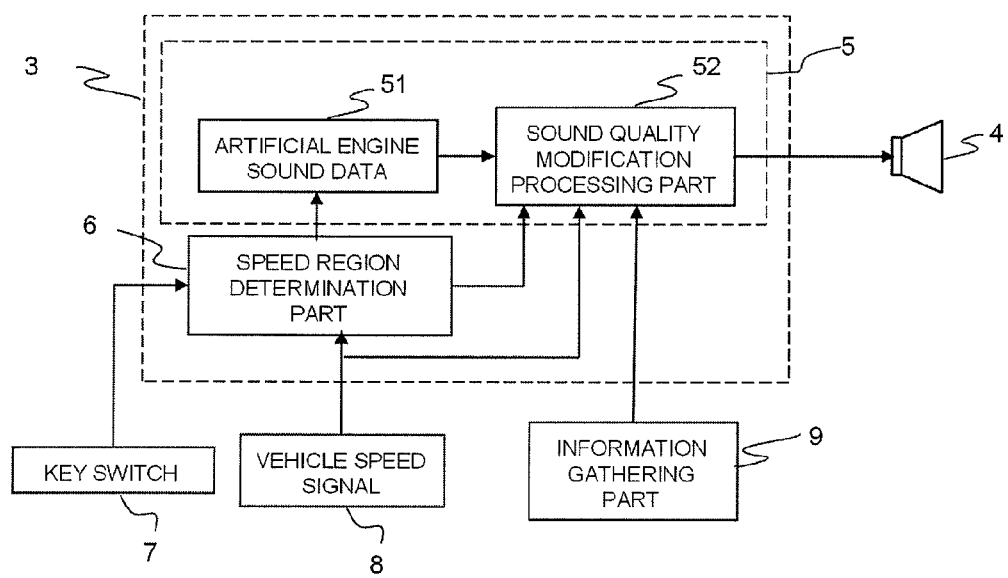
FIG. 12 is a block diagram showing the configuration of a main part of an artificial engine sound control unit according to Embodiment 3 of the present invention.

FIG. 12 is a block diagram showing the configuration of a main part of an artificial engine sound control unit according to Embodiment 3 of the present invention. In FIG. 12, the symbol which is same as that in FIG. 3 indicates the same part or the corresponding part. An artificial engine sound generating part 5 of an artificial engine sound control unit in Embodiment 3 comprises an artificial engine sound data 51 and a sound quality modification processing part 52 which changes the quality of sound which is generated in the artificial engine sound data 51.

Further, the sound quality modification processing part 52 in the artificial engine sound generating part 5 inputs signals from an information gathering part 9 such as a microphone, a camera and a sensor which are mounted to outside a vehicle, and an in-vehicle equipment including a damping brake (foot brake) signal, a parking brake signal, a gear position signal and an accelerator pedal position signal. The information gathering part obtains noise information of vehicle external environment, information indicating the presence or absence of obstacles including pedestrians, bicycles, bikes, etc., information indicating the distance to the obstacles, information indicating the presence time of the obstacles, and information indicating the state of in-vehicle equipment including a foot brake, a parking brake, a gear, an accelerator, etc., and outputs the obtained information to the sound quality modification processing part 52.

In the same way as that of Embodiment 1 and Embodiment 2, Embodiment 3 regards to the artificial engine sound generation in the state in which an electric vehicle is stopped, that is, in the a:key-on region and the b:key-on stop region in the speed region shown in FIG. 4.

Figure 13:
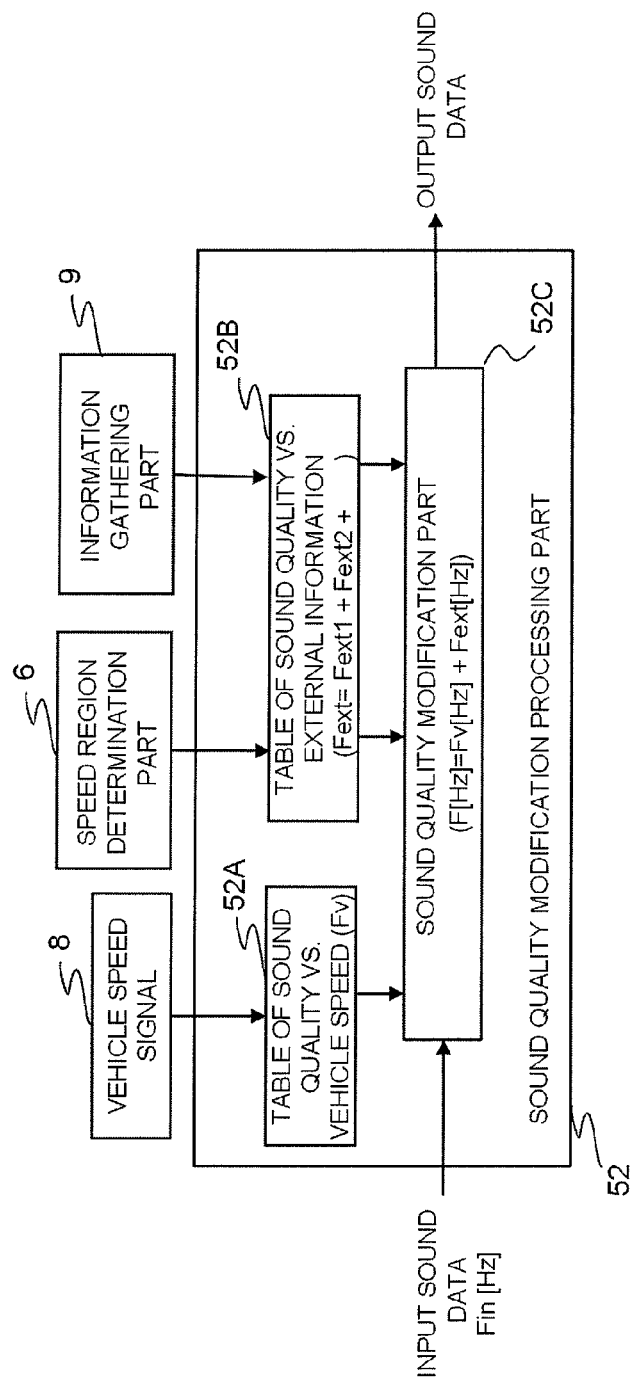
FIG. 13 is a block diagram showing the configuration of a sound quality modification part of an artificial engine sound control unit according to Embodiment 3 of the present invention.

FIG. 13 shows the details of the configuration of the sound quality modification processing part 52. The sound quality modification processing part 52 comprises a table 52A of sound quality versus vehicle speed, a table 52B of sound quality versus external information and a sound quality modification part 52C. The table 52A of sound quality versus vehicle speed holds the amount of frequency change Fv[Hz] corresponding to the change of vehicle speed. In the a:key-on region and the b:key-on stop region, the sound quality of the artificial engine sound which is inputted is not changed. When an electric vehicle is started to run, the frequency is changed to higher frequency corresponding to the increase of the vehicle speed. The table 52A of sound quality versus vehicle speed outputs the amount of frequency change Fv[Hz], which is changed with increasing of the vehicle speed, to the sound quality modification part 52C by using the vehicle speed information which is obtained by the vehicle speed signal 8. Further, the vehicle speed may be changed to an acceleration, and the amount of frequency change Fv[Hz] may be outputted to the sound quality modification part 52C.

The table 52B of sound quality versus external information holds the amount of frequency change corresponding to noise information of vehicle external environment, information indicating the presence or absence of obstacles including pedestrians, bicycles, bikes, etc., information indicating distance to the obstacles, and information indicating presence time of the obstacles which is obtained by the information gathering part 9. For example, the table 52B of sound quality versus external information, as shown in a table in FIG. 14, may hold the amount of frequency change Fext1 with respect to the presence time of a obstacle, the amount of frequency change Fext2 with respect to the noise level in the vicinity and the amount of frequency change Fext3 with respect to the frequency band of noise in the vicinity. Further, the table 52B of sound quality versus external information may hold the amount of frequency change corresponding to information indicating the state of a damping brake (foot brake), a parking brake, a gear and an accelerator, etc. which is obtained by the information gathering part 9. For example in a case where a speed region is the a:key-on region and the b:key-on stop region, the table 52B of sound quality versus external information, as shown in a table in FIG. 15, may hold the amount of frequency change Fext4 with respect to the state of a parking brake, the amount of frequency change Fext5 with respect to the state of a food brake and the amount of frequency change Fext6 with respect to the state of a gear. Individual parameters indicated by Fext may have correlations each other or may be treated as an independent parameter. Further, numeral values shown in FIG. 14 and FIG. 15 are example, and numeral values are not limited to these.

As above-mentioned, the frequency can be changed by information indicating the state of a damping brake (foot brake), a parking brake, a gear and an accelerator, etc. which is obtained by the information gathering part 9. Especially, by the above-mentioned information, the state in which an electric vehicle comes close to a start running mode can be detected, the sound quality can be changed by changing the frequency, and the state in which the electric vehicle which is stopped comes close to a start running mode can be informed to pedestrians, etc. so as to urge them to pay attention.

The table 52B of sound quality versus external information outputs Fext (=Fext1+Fext2+Fext3+ . . . ) [Hz] which is the total of amount of frequency change of individual external information to the sound quality modification part 52C. The table 52B of sound quality versus external information may hold the amount of frequency change with respect to other external information. Further, the amount of frequency change for individual speed regions may be held.

The sound quality modification part 52C obtains the amount of frequency change F[Hz] of the inputted artificial engine sound based on Fv[Hz] which is the total of the amount of frequency change which is outputted from the table 52A of sound quality versus vehicle speed and the amount of frequency change Fext[Hz] which is outputted from the table 52B of sound quality versus external information. The sound quality modification part 52C changes the frequency of the sound data which is inputted to the sound quality modification part 52 only by the amount of frequency change F[Hz]. As a method for changing the frequency, SRC(Sampling rate converter) may be used or FFT processing or pitch conversion may be used. By using the above-mentioned method, the sound quality of the artificial engine sound can be changed corresponding to the change of vehicle speed, acceleration and external information.

According to the Embodiment 3, for example, as the frequency is changed corresponding to the speed, it becomes easier for pedestrians, etc. in the vicinity to perceive the speed of electric vehicles. Further, by differentiating the sound quality between own vehicle and other vehicle, for example, the vehicle which comes close to and goes ahead, it becomes easier for pedestrians in the vicinity to perceive the presence of own vehicle. The sound quality which is different from the band of noise in the surrounding can be generated, therefore, it is easier to perceive the vehicles. By including the information indicating the size of a vehicle in a signal which is outputted from the information gathering part 9, it becomes easier for pedestrians, etc. in the vicinity to presume the size of the vehicle which are approaching. Further, according to the Embodiment 3, by changing the frequency, without increasing the volume, it becomes easier for pedestrians, etc. in the vicinity to perceive the presence of the vehicle. Consequently, the nuisance of noise pollution can be avoided. In order to increase the appeal of the sense of presence to the surrounding when the state in which a vehicle comes close to a start running mode is detected, for example, the frequency of the artificial engine sound to be emitted may be the frequency of 1 to 2 kHz which is offensive to the ear. Specifically, Fext[Hz] which is the total of the amount of frequency change of individual external information may be adjusted to the amount of frequency change Fv[Hz] corresponding to the vehicle speed change so as for the frequency of the artificial engine sound to be emitted with respect to the input sound data Fin[Hz] to be the above-mentioned frequency. Further, the vehicle speed at this moment is presumed to be nearly 0 (zero), therefore, the amount of frequency change may be adjusted with respect to the amount of frequency change Fv[Hz] corresponding to the vehicle speed zero (0).

Embodiment 4

Figure 16:
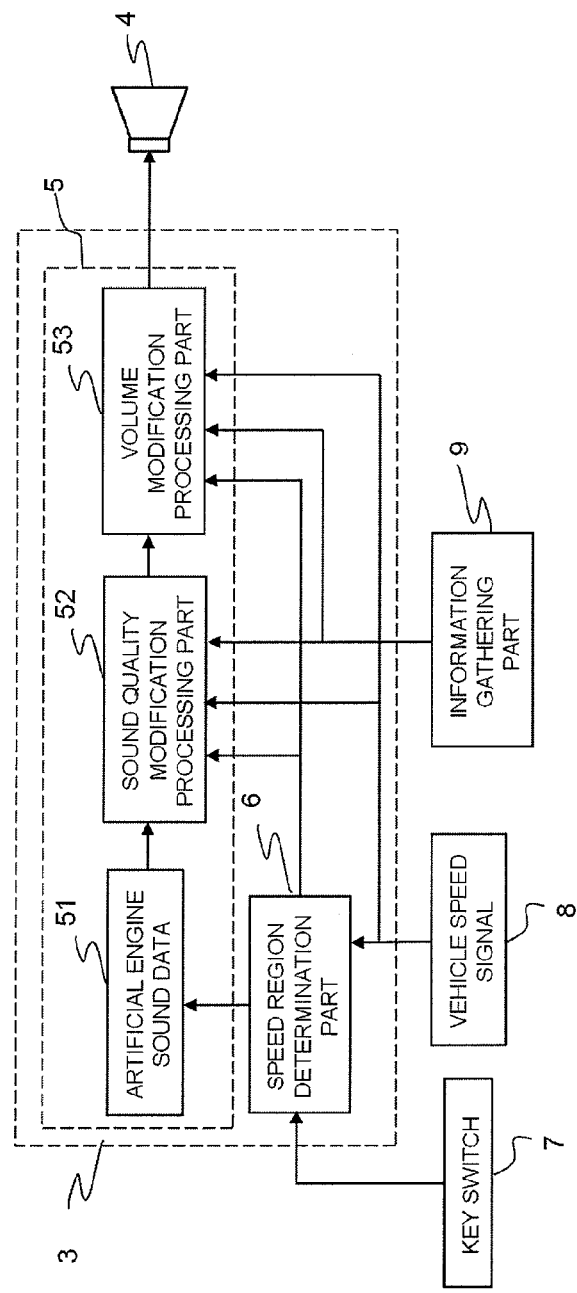
FIG. 16 is a block diagram showing the configuration of a main part of an artificial engine sound control unit according to Embodiment 4 of the present invention.

FIG. 16 is a block diagram showing the configuration of a main part of an artificial engine sound control unit according to Embodiment 4 of the present invention. In FIG. 16, the symbol which is same as that in FIG. 3 and FIG. 12 indicates the same part or the corresponding part. An artificial engine sound generating part 5 of an artificial engine sound control unit in Embodiment 4 comprises an artificial engine sound data 51, a sound quality modification processing part 52 which changes the quality of sound which is generated in the artificial engine sound data 51 and a volume modification processing part 53 which changes the volume.

Further, the artificial engine sound generating part 5 inputs a signal from an information gathering part 9 such as a camera and a sensor which are mounted to outside of a vehicle, and an in-vehicle equipment including a damping brake (foot brake) signal, a parking brake signal, a gear position signal and an accelerator pedal position signal. The information gathering part obtains noise information of vehicle external environment, information indicating the presence or absence of obstacles including pedestrians, bicycles, bikes, etc., information indicating the distance to the obstacles, information indicating the presence time of the obstacles, and information indicating the state of in-vehicle equipment including a foot brake, a parking brake, a gear, an accelerator, etc., and outputs the obtained information to the sound quality modification processing part 52 and the volume modification processing part 53.

Next, the operation will be described. The artificial engine sound data 51 is a sound which evokes the running of vehicles. A key switch 7 is a start key of electric cars, and outputs a signal of ON and OFF of the switch to a speed region determination part 6. A vehicle speed signal 8 obtains a vehicle speed signal and outputs the obtained vehicle speed signal to the speed region determination part 6, the sound quality modification processing part 52 and the volume modification processing part 53. On this occasion, acceleration may be outputted based on the change amount of the vehicle speed signal.

Figures 17, 18:
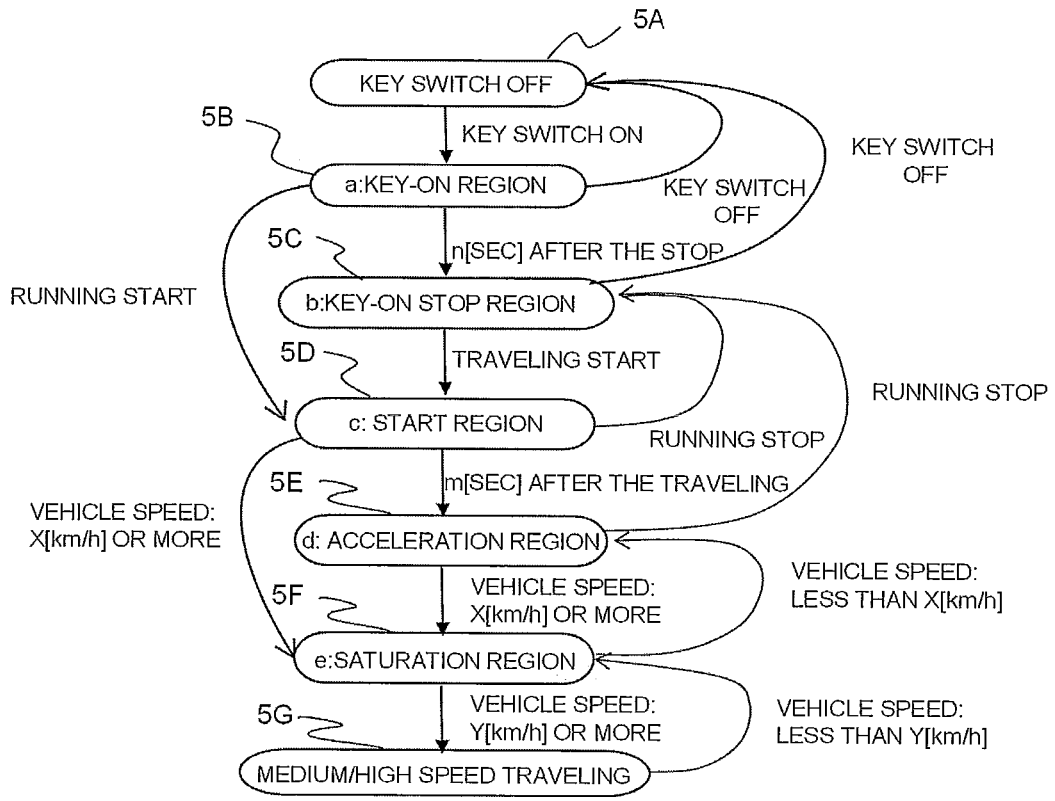
FIG. 17 is a diagram showing an example of state transitions of speed regions according to Embodiment 4 of the present invention.
FIG. 18 is a table showing an example of a table of sound quality versus vehicle speed with respect to a sound quality modification part according to Embodiment 4 of the present invention.

The speed region determination part 6 divides the speed region, in which the speed is reached to a predetermined speed from the state of 0 (zero) of vehicle speed when a vehicle is stopped, into two or more parts based on the information which is obtained by the key switch 7 and the vehicle speed signal 8, and determines such that the state of the electric vehicle as of now is which speed region. FIG. 17 shows an example of a state transition of speed region, when a speed region is divided into five regions in which the speed is reached to a predetermined speed from the state of 0(zero) of vehicle speed when a vehicle is stopped. The speed region determination part 6 divides a speed region of an electric vehicle into five regions, that is, a:key-on region, b:key-on stop region, c:start region, d:acceleration region, and e:saturation region, and determines such that the state of the electric vehicle as of now is which region.

The a:key-on region (5B) is a speed region where immediately after the key switch 7 is turned ON. Regarding a vehicle driven by an engine, an idling sound is generated by turning the key switch ON while the vehicle is parked. Under these conditions, pedestrians who approach the vehicle have a habit of avoiding the vehicle which is in an idling stop state. However, an electric vehicle driven by a motor do not generate an idling sound while the electric vehicle is stopped, therefore, the electric vehicle is silent. Under the above mentioned condition, pedestrians who approach the electric vehicle can not avoid the danger voluntarily, and the possibility of contact-dangerous degree becomes high at the time of start running of the electric vehicle. Consequently, this condition is extremely dangerous. In addition to that, it is also difficult for a driver to perceive intuitively such that the key switch 7 is turned ON or not because the idling sound can not be heard. In order to avoid the above-mentioned dangerous condition, in the a:key-on region (5B), an artificial idling sound is generated so as for persons in the vicinity of the electric vehicle to perceive the operation of the electric vehicle.

In a case where the idling state lasts for a long period, the nuisance of noise pollution for other pedestrians in the vicinity and residents living in the vicinity can be eliminated without bringing a danger to target pedestrians to be informed by providing a speed region (b:key-on stop region (5C)) in which a volume level is decreased after a predetermined time is elapsed. It is preferable such that the volume of the artificial idling sound is lower than that of the artificial engine sound at the time of start running in order to eliminate the nuisance of noise pollution while idling.

The c:start region (5D) is a speed region where immediately after the running is started, and the d:acceleration region (5E) is a speed region where immediately after the start region is completed and the artificial engine sound is determined to be necessary. By changing the volume and the sound quality of the artificial engine sound with increasing of vehicle speed and acceleration, pedestrians in the vicinity of an electric vehicle can grasp the change of speed of the electric vehicle aurally. Consequently, the safety can be improved. The c:start region and the d:acceleration region are regions where the volume and the sound quality of the artificial engine sound changes with increasing/decreasing of vehicle speed or acceleration. Regarding a vehicle driven by an engine, acceleration is usually made immediately after the running is started, therefore, the engine sound is large. So, in the c:start region, until any predetermined time is elapsed after the running is started, the volume is made to be higher than that of the artificial engine sound which is generated at the same speed in the d:acceleration region.

The e:saturation region (5F) is a speed region where the change of the volume of the artificial engine sound with increasing/decreasing of vehicle speed or acceleration is converged to a constant volume or is decreased. When an electric vehicle runs at a low speed, the running sound is very quiet. However, when the electric vehicle runs at a high speed to some extent, for example, at a speed exceeding 20 [km/h], by increasing the volume, such as wind noise or the road surface noise, the level of sound approaches to the noise level of conventional cars. Therefore, pedestrians, etc. in the vicinity of the electric vehicle can perceive the presence of the electric vehicle. In the e:saturation region, before the vehicle speed reaches the region in which the artificial engine sound is unnecessary, the volume and the sound quality of the artificial engine sound is controlled so as for the artificial engine sound not to be interrupted unnaturally.

Regarding the state transition diagram of FIG. 17, description will be made. When the key switch 7 is changed from OFF (5A) to ON, the speed region determination part 6 determines such that the speed region of an electric vehicle is the a:key-on region (5B). When the speed region of an electric vehicle is the a:key-on region (5B), and the electric vehicle starts to run (vehicle speed=0 [km/hl]), the speed region determination part 6 determines such that the speed region is the c:start region (5D). When the speed region of an electric vehicle is the a:key-on region (5B), and the electric vehicle does not start to run even n[seconds] is elapsed, the speed region determination part 6 determines such that the speed region of the electric vehicle is the b:key-on stop region (5C). This n[seconds} is any time which is considered such that the state in which the electric vehicle is stopped is maintained. When the speed region of an electric vehicle is the b:key-on region (5C), and the electric vehicle starts to run (vehicle speed=0 [km/hl]), the speed region determination part 6 determines such that the speed region is the c:start region (5D).

For m[second(s)] after the speed region of an electric vehicle is determined to be the c:start region (5D), (that is, after the electric vehicle starts to run) the determination such that the speed region of the electric vehicle is the c:start region (5D) is maintained. However, the maintenance time period exceeds m[second(s)], the speed region determination part 5 determines such that the speed region of an electric vehicle is the d:acceleration region (5E). This m[seconds] at this time is any time that evokes the acceleration which is made immediately after gasoline cars start to run.

In a case where a vehicle speed exceeds X[km/h] before the maintenance time period exceeds m[seconds] after the speed region of an electric vehicle is determined to be the c:start region (5D), the speed region determination part 6 determines such that the speed region of the electric vehicle is the e:saturation region (5F). This X[km/h] is any minimum speed of the electric vehicle which is determined such that it is not necessary to increase the volume of the artificial engine sound or the volume of the artificial engine sound may be decreased because with increasing the running speed of the electric vehicle, the volume of running sound (such as wind noise or the road surface noise) other than the artificial engine sound becomes large.

When the speed region of an electric vehicle is the d:acceleration region (5E), in a case where the vehicle speed exceeds X[km/h], the speed region determination part 6 determines such that the speed region of the electric vehicle is the e:saturation region (5F).

When the speed region of an electric vehicle is the e:saturation region (5F), in a case where the vehicle speed exceeds Y[km/h] which is larger than X[km/h], it is determined such that the electric vehicle is not at a low-speed running where it is necessary to generate the artificial engine sound, and then the generation of the artificial engine sound is stopped, and the electric vehicle becomes to the state of medium-speed running or high-speed running. This Y[km/h] is, for example, 20 [km/h], which is any speed of an electric vehicle determined such that it is not need to generate the artificial engine sound for the electric vehicle.

Not only when the speed is accelerated but also the speed is decelerated, the same judgment is made. These transition states are shown by transition arrows at right in FIG. 17. In a case where a speed region of an electric vehicle is the a:key-on stop region (5B) or the b:key-on stop region (5C), when the key switch 7 is turned OFF, the speed region determination part 6 determines such that a speed region of the electric vehicle does not apply to any of the speed regions, and then the state transition becomes the key switch OFF (5A). In a case where a speed region of an electric vehicle is the c:start region or the d:acceleration region, when the running of the electric vehicle is stopped (vehicle speed=0), the speed region determination part 6 determines such that the speed region of the electric vehicle is the b:key-on stop region. In a case where a speed region of an electric vehicle is the e:saturation region, when the vehicle speed is less than X[km/h], the speed region determination part 6 determines such that a speed region of the electric vehicle is the d:acceleration region (5E). In a case where an electric vehicle runs at a medium-speed or a high-speed, when the vehicle speed is less than Y[km/h], the speed region determination part 6 determines such that a speed region of the electric vehicle is the e:saturation region (5F).

On the other hand, the sound quality modification processing part 52 shown in FIG. 16 changes the sound quality of the artificial engine sound generating part 5. When the sound quality is changed, the sound quality modification processing part 52 controls the sound quality of an artificial engine sound to be different sound quality for individual speed regions which are determined by the speed region determination part 6 based on the information obtained by the vehicle speed 8, the information gathering part 9 and the speed region determination part 6. The details of the sound quality modification processing part 52 are same as that of FIG. 13 described in Embodiment 3. The sound quality modification processing part 52 comprises a table 52A of sound quality versus vehicle speed, a table 52B of sound quality versus external information and a sound quality modification part 52C.

Figures 19, 20:
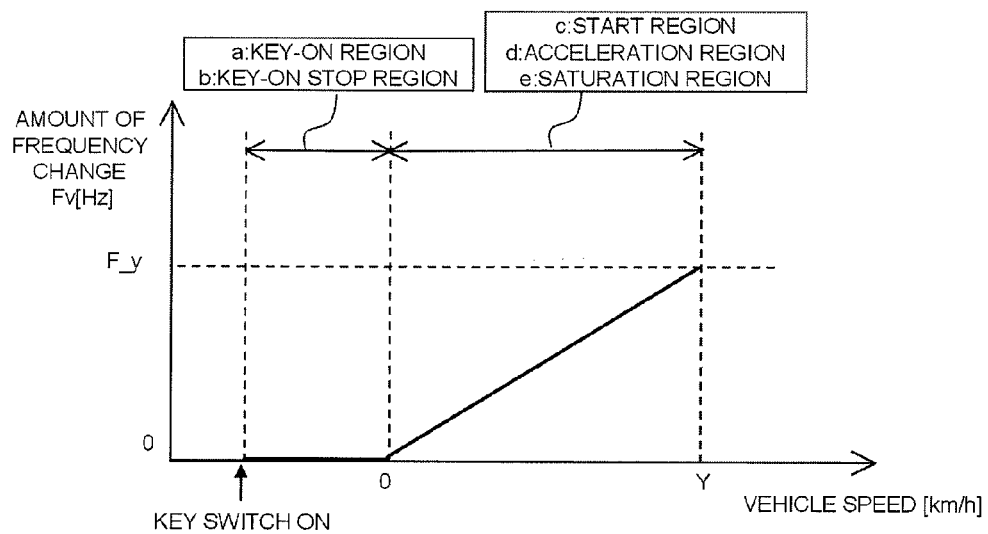
FIG. 19 is a diagrammatic view showing an example of the characteristic of a table of sound quality versus vehicle speed with respect to a sound quality modification part according to Embodiment 4 of the present invention.
FIG. 20 is a table showing an example of a table of sound quality versus external information with respect to a sound quality modification part according to Embodiment 4 of the present invention.

The table 52A of sound quality versus vehicle speed holds a table of amount of frequency change Fv[Hz] corresponding the change of a vehicle speed, as shown in the table in FIG. 18. The characteristic example of the table 52A of sound quality versus vehicle speed is shown in FIG. 19. In the characteristic example shown in FIG. 19, the sound quality of an artificial engine sound which is inputted is not changed in the a:key-on region (5B) and the b:key-on stop region, when an electric vehicle is started to run, the sound quality of the artificial engine sound which is inputted is changed to a high frequency side corresponding to the increase of the vehicle speed. The table 52A of sound quality versus vehicle speed outputs the amount of frequency change Fv[Hz] according to an increase/decrease of vehicle speed to the sound quality processing part 52 using the vehicle speed information which is obtained by the vehicle speed signal 8. Further, the above mentioned vehicle speed may be changed to the acceleration, and then the amount of frequency change Fv[Hv] may be outputted to the sound quality modification part 52C.

The table 52B of sound quality versus external information holds the sound amount of frequency change corresponding to noise information of vehicle external environment which is obtained by the information gathering part 9, information indicating the presence or absence of obstacles including pedestrians, bicycles, bikes, etc., information indicating the distance to the obstacles, and information indicating the presence time of the obstacles. For example, the table 52B of sound quality versus external information, as shown in a table in FIG. 14 which is described in EMBODIMENT 3, may hold the amount of frequency change Fext1 with respect to the presence time of an obstacle, the amount of frequency change Fext2 with respect to the distance of an obstacles, and the amount of frequency change Fext3 with respect to the level of noise in the vicinity. Further, the table 52B of sound quality versus external information may hold the amount of frequency change corresponding to the information indicating the state of a parking brake, a foot brake and a gear which is obtained by the information gathering part 9. For example, in a case where a speed region is the a:key-on region and the b:key-on stop region, the table 52B of sound quality versus external information, as a table shown in FIG. 15 which is described in Embodiment 3, may hold the amount of frequency change Fext4 with respect to the state of a parking brake, the amount of frequency change Fext5 with respect to the state of a foot brake, and the amount of frequency change Fext6 with respect to the state of a gear. On the other hand, as a table shown in FIG. 20, in a case where the speed region is the c:start region, the d:acceleration region and the e:saturation region, the amount of frequency change Fext4 with respect to the amount of stepping on a foot brake may be held. Individual parameters indicated by Fext may have correlations each other or may be treated as an independent parameter. Further, numeral values shown in FIG. 14, FIG. 15 and FIG. 20 are example, and numeral values are not limited to these.

As above-mentioned, the frequency can be changed by information indicating the state of a damping brake (foot brake), a parking brake, a gear and an accelerator, etc. which is obtained by the information gathering part 9. Especially, by the above-mentioned information, the state in which an electric vehicle comes close to a start running mode can be detected, the sound quality can be changed by changing the frequency, and the state in which the electric vehicle which is stopped comes close to a start running mode can be informed to pedestrians, etc. so as to urge them to pay attention.

The table 52B of sound quality versus external information outputs Fext (=Fext1+Fext2+Fext3+ ... ) [Hz] which is the total of amount of frequency change of individual external information to the sound quality modification part 52C. The table 52B of sound quality versus external information may hold the amount of frequency change with respect to other external information. Further, the amount of frequency change for individual speed regions may be held.

The sound quality modification part 52C obtains the amount of frequency change F[Hz] of the inputted artificial engine sound based on Fv[Hz] which is the total of the amount of frequency change which is outputted from the table 52A of sound quality versus vehicle speed and the amount of frequency change Fext[Hz] which is outputted from the table 52B of sound quality versus external information. The sound quality modification part 52C changes the frequency of the sound data which is inputted in the sound quality modification part 52 only by the amount of frequency change F[Hz]. As a method for changing the frequency, SRC (Sampling rate converter) may be used or FFT processing or pitch conversion may be used. By using the above-mentioned method, the sound quality of the artificial engine sound can be changed corresponding to the change of vehicle speed, acceleration and external information.

Next, the operation of the volume modification processing part 53 which changes the volume of an artificial engine sound to be generated, shown in FIG. 16, will be described. The details of the volume modification processing part 53 is same as that shown in FIG. 5 which is described in Embodiment 2. The volume modification processing part 53 comprises a table 53A of volume versus vehicle speed, a table 53B of volume versus time, a table 53C of volume versus external information, and a volume level modification part 53D. The volume modification processing part 53 controls the volume of an artificial engine sound to be different volumes for individual speed regions which are determined by the speed region determination part 6 based on the information obtained by the vehicle speed 8, the information gathering part 9 and the speed region determination part 6.

Figures 21, 22:
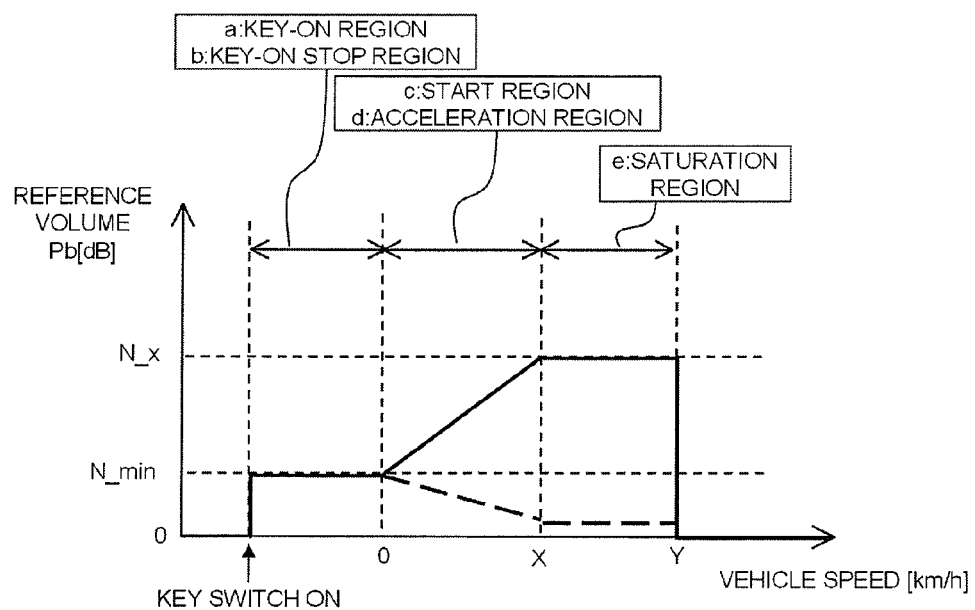
FIG. 21 is a table showing an example of a table of volume versus vehicle speed with respect to a sound quality modification part according to Embodiment 4 of the present invention.
FIG. 22 is a diagrammatic view showing an example of the characteristic of a table of vehicle speed-volume with respect to a sound quality modification part according to Embodiment 4 of the present invention.
Figure 23:
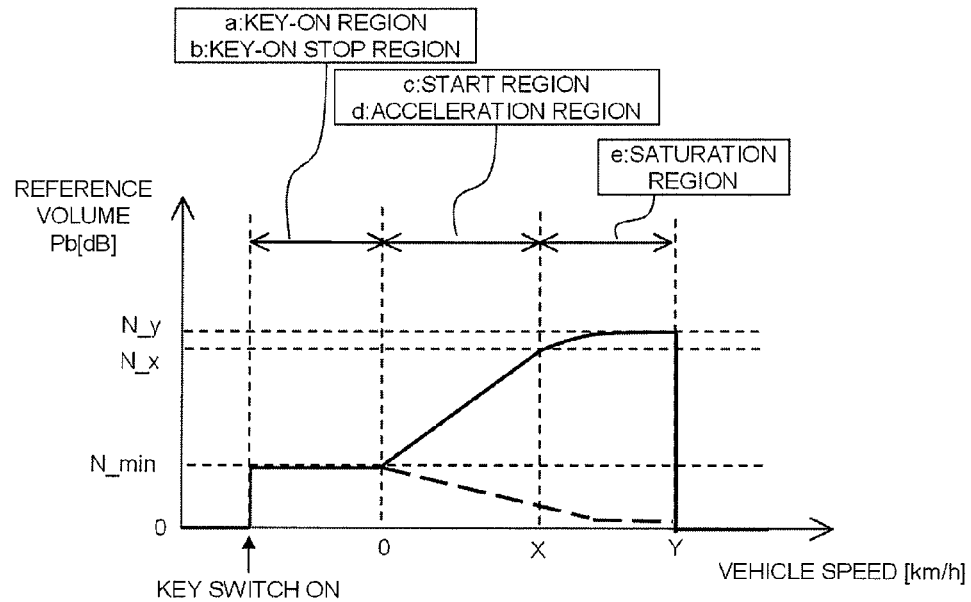
FIG. 23 is a diagrammatic view showing another example of the characteristic of a table of volume versus vehicle speed with respect to a sound quality modification part according to Embodiment 4 of the present invention.
Figure 24:
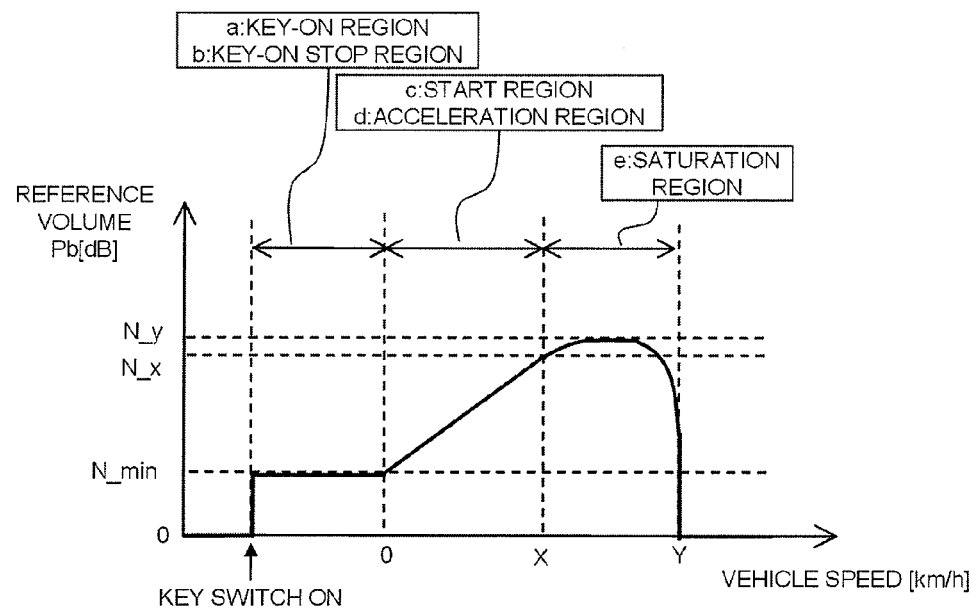
FIG. 24 is a diagrammatic view showing another example of the characteristic of a table of volume versus vehicle speed with respect to a sound quality modification part according to Embodiment 4 of the present invention.

The table 53A of volume versus vehicle speed holds, as a table shown in FIG. 21, a table of a volume Pb[dB] which is a reference corresponding to the change of a vehicle speed. The characteristic examples of the table 53A of volume versus vehicle speed are shown in FIG. 22, FIG. 23 and FIG. 24. In these characteristic examples, the volume of an artificial engine sound which is inputted in the a:key-on region and the b:key-on stop region is a constant value and is not changed. In the c:start region and the d:acceleration region, when an electric vehicle starts to run, the volume is increased corresponding to the increase of the vehicle speed. At this time, when the vehicle speed is accelerated, a tire sound is added to the vehicle noise. Therefore, as shown by a broken line in FIG. 22 and FIG. 23, the characteristic such that the volume is decreased corresponding to the increase of the vehicle speed may be acceptable. According to the characteristic, the effect such that electric power stored in the battery can be increased is expected. In the e:saturation region, as shown in FIG. 22, the characteristic such that a constant value N_x[dB] is always outputted may be acceptable, or as shown in FIG. 23, the characteristic such that the value becomes gradually to N_y[dB] may be acceptable. Further, when the vehicle speed reaches the vehicle speed where the generation of an artificial engine sound is judged to be unnecessary, the characteristic such that the volume is gradually decreased before the vehicle speed reaches Y[km/h] where the generation of an artificial engine sound is unnecessary as shown in FIG. 24 may be acceptable. The table 53A of volume versus vehicle speed outputs the reference volume Pb[dB] according to the increasing of the vehicle speed to the volume modification part 53D by using the vehicle speed information which obtained by the vehicle speed signal 8. Further, the above mentioned vehicle speed may be changed to the acceleration, and then the reference volume Pb[dB] may be outputted to the volume modification part 53D.

As shown in a table shown in FIG. 25, the table 53B of volume versus time holds a table of the amount of volume change Pt[dB] corresponding to the change of time for individual speed regions. Here, the amount of volume change refers to the amount of change of a volume from the reference volume. Characteristic examples of the a:key-on region and the b:key-on stop region of the table 53B of volume versus time are, for example, FIG. 7, FIG. 8 and FIG. 9 which are described in Embodiment 2. In the a:key-on region, when the key switch 7 is turned ON, an idling sound is generated. It is necessary for pedestrians in the vicinity and a driver to recognize such that the key switch 7 is turned ON. Therefore, as shown in the characteristic example of FIG. 7, it is preferable such that a volume of an artificial engine sound is made to be slightly larger than the normal reference volume. Further, there is the possibility such that pedestrians, etc. are surprised by the situation in which the artificial engine sound is suddenly generated. Therefore, the volume of the artificial engine sound may be increased gradually as shown in FIG. 8. Or, as shown in FIG. 9, an artificial engine sound having a small volume may be generated at the beginning, and then, an artificial engine sound having a large volume may be generated. In the b:key-on stop region, in order to avoid the noise pollution of the artificial engine sound while an electric vehicle is stopped, it is preferable such that the artificial engine sound has the characteristic in which the volume can be changed to be small.

Figure 26:
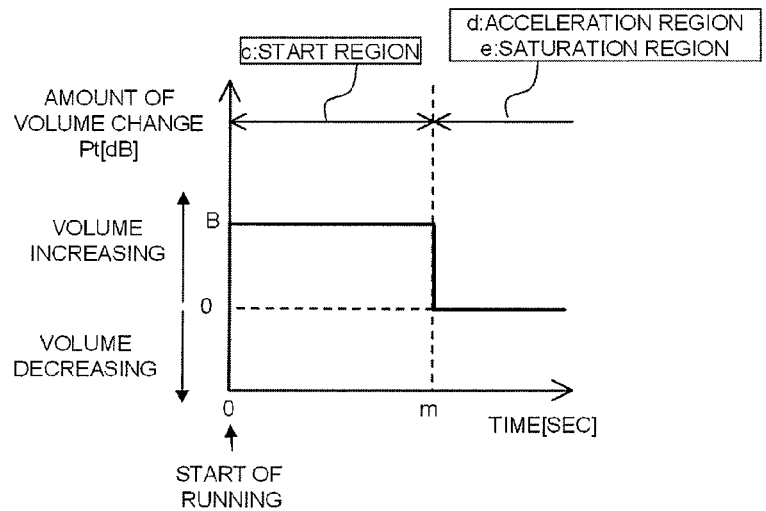
FIG. 26 is a diagrammatic view showing an example of the characteristic of a table of volume versus time with respect to a volume modification part according to Embodiment 4 of the present invention.
Figure 27:
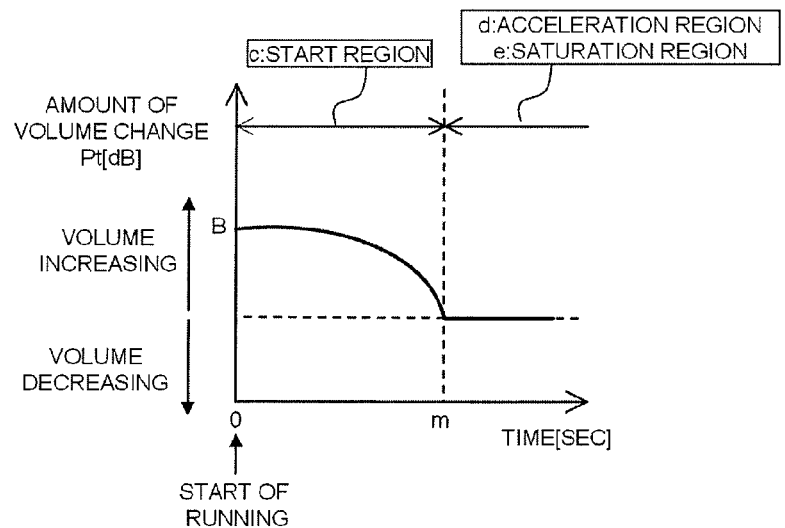
FIG. 27 is a diagrammatic view showing another example of the characteristic of a table of volume versus time with respect to a volume modification part according to Embodiment 4 of the present invention.
Figures 28, 29:
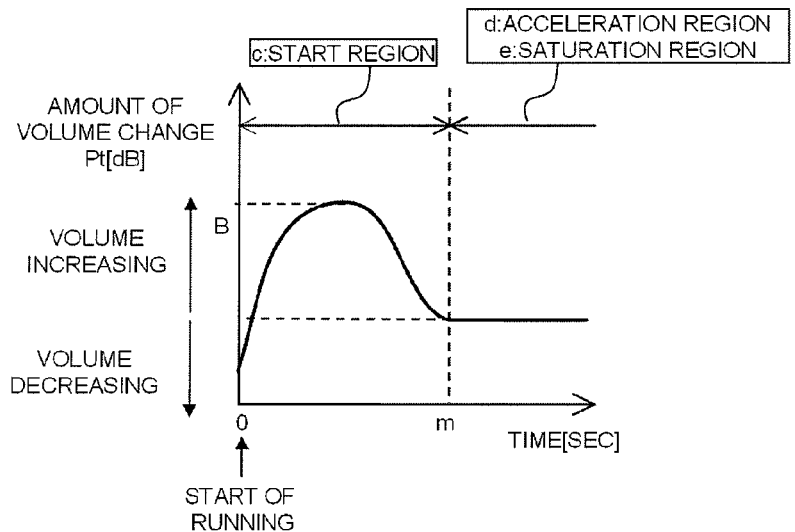
FIG. 28 is a diagrammatic view showing another example of the characteristic of a table of volume versus time with respect to a volume modification part according to Embodiment 4 of the present invention.
FIG. 29 is a table showing an example of a table of volume versus external information with respect to a volume modification part according to Embodiment 4 of the present invention.

The characteristic examples of the table 53B of volume versus time in the c:start region, the d:acceleration region and the e:saturation region are shown in FIG. 26, FIG. 27 and FIG. 28. A normal engine is accelerated when a vehicle starts to run, so, the running sound becomes large. Therefore, in the c:start region, the volume may be larger than that of normal reference volume. For example as shown in FIG. 26, the characteristic such that the amount of volume change is always a constant value B so as to increase the volume may be acceptable. Or, the characteristic such that the amount of volume change is made to be large at the beginning and then the amount of volume change is made to be small by every lapse of time may be acceptable. Further, when the volume suddenly becomes large, pedestrians in the vicinity of the electric vehicle will be surprised. Therefore, as shown in FIG. 28, the characteristic such that the amount of volume change is gradually increased gradually and is decreased after a time is lapsed to some extent may be acceptable. Further, in order to bring an artificial engine sound close to normal engine sound, the maximum amount of volume change A of an artificial engine sound in the a:key-on region as shown in FIG. 7, FIG. 8 and FIG. 9 is made to be smaller than the maximum amount of volume change B of an artificial engine sound in the c:start region as shown in FIG. 26, FIG. 27 and FIG. 28. The table 53B of volume versus time outputs the amount of volume change Pt[dB] corresponding to change of time for individual regions to the volume modification part 53D by using the speed region information which is obtained by the speed region determination part 6.

The table 53C of volume versus external information holds the amount of volume change corresponding to noise information of vehicle external environment which is obtained by the information gathering part 9, information indicating the presence or absence of obstacles including pedestrians, bicycles, bikes, etc., information indicating the distance to the obstacles, and information indicating the presence time of the obstacles. For example, as shown in a table in FIG. 10, which is described in Embodiment 2, the table 53C of volume versus external information may hold the amount of volume change Pext1 with respect to the presence time of an obstacle, the amount of volume change Pext2 with respect to the distance to an obstacle, and the amount of volume change Pext3 with respect to the level of noise in the vicinity. By using the above-mentioned amount of volume change, in a case where pedestrians stay for a long time in the vicinity of an electric vehicle or in a case where the distance between pedestrians and the electric vehicle is short, it is easier for pedestrians to perceive the presence of the electric vehicle. On the contrary, when it is determined such that pedestrians perceive the presence of the electric vehicle, the volume may be decreased so as not to cause discomfort to others in the vicinity. Further, the table 53C of volume versus external information may hold the volume amount corresponding to the information indicating the state of a damping brake (foot brake), a parking brake, a gear or an accelerator which is obtained by the information gathering part 9. For example, in a case where a speed region is the a:key-on region and the b:key-on stop region, as shown in a table in FIG. 11, which is described in Embodiment 2, the table 53C of volume versus external information may hold the amount of volume change Pext4 with respect to the state of a parking brake, the amount of volume change Pext5 with respect to the state of a foot brake, the amount of volume change Pext6 with respect to the state of a gear and the amount of volume change Pext7 with respect to the accelerator pedal position. On the other hand in a case of a speed region is the c:start region, the d:acceleration region or the e:saturation region, the amount of volume change Pext5 with respect to the amount of stepping on a foot brake may be held as shown in a table in FIG. 29. The table 53C of volume versus external information outputs Pext (=Pext1+Pext2+Pext3+ . . . ) [dB] which is the total of amount of volume change of individual external information to the volume modification part 53D. The table 53C of volume versus external information may hold the amount of volume change with respect to other external information. Further, the amount of volume change for individual speed regions may be held. Individual parameters indicated by Pext may have correlations each other or may be treated as an independent parameter. Further, numeral values shown in FIG. 10, FIG. 11 and FIG. 29 are example, and numeral values are not limited to these.

Further, as the volume modification processing part 53 is provided at an artificial engine sound control unit in FIG. 16, as a broken line in FIG. 7 and FIG. 8, by the information indicating the state of a damping brake (a food brake), a parking brake, or a gear which is obtained by the information gathering part 9, the state in which an electric vehicle is becoming to the start running mode is detected, and then, in order to urge pedestrians, etc. in the vicinity of the electric vehicle to pay attention by increasing the volume, the modification such as increasing the volume at the time when a parking brake is turned OFF can be made. For example, the state in which an electric vehicle comes close to a start running mode can be detected not only by the above-mentioned parking brake state but also by the state in which a brake (both of the food brake and the parking brake, or either of them) is changed from the ON-state to the OFF-state. Or the state in which a vehicle comes close to a start running mode may be detected by the state in which a key switch is switched from an accessory position to an ignition (capable of driving a motor) position, the state in which a position of a gear is changed, or in the state of capable of driving a motor, an accelerator pedal is pressed on. Especially, by the above-mentioned information, the state in which an electric vehicle comes close to a start running mode can be detected, the volume can be changed, and the state in which the electric vehicle which is stopped comes close to a start running mode can be informed to pedestrians, etc. so as to urge them to pay attention. In Embodiment 4, in addition to the volume, the sound quality can be changed by detecting the state in which an electric vehicle comes close to a start running mode, the state in which the electric vehicle which is stopped comes close to a start running mode can be informed to pedestrians, etc. more clearly so as to urge them to pay more attention.

Further, the sound quality modification processing part 52 is also provided, provided at an artificial engine sound control unit in FIG. 16, therefore, by detecting the state in which an electric vehicle comes close to a start running mode, not only the volume but also the sound quality can be adjusted. Further, not both of the sound quality and the volume, but either one of them may be changed. This change includes making the silent state. Further, in a case where the volume is increased or the frequency is changed to the frequency band which is offensive to the ear, by changing the state suddenly, people in the vicinity might be surprised and terrified, therefore, the operation in which the state is changed gradually may be taken into consideration.

The volume modification part 53D adds the amount of a change of a volume Pt[dB] which is outputted from the table 53B of volume versus time and the amount of a change of a volume Pext[dB] which is outputted from the table 53C of volume versus external information to the reference volume Pb[dB] which is outputted from the table 53A of volume versus vehicle speed so as to make the volume P[dB] of the artificial engine sound to be outputted. The volume modification part 53D controls the level of an input sound data to be the volume P[dB]. By using the above-mentioned methods, the volume of the artificial engine sound which is emitted from the outside of an electric vehicle can be changed corresponding to changes of the vehicle speed, the acceleration and the external information.

The sounding body 4 such as a speaker as shown in FIG. 1 emits the sound which is outputted from the volume modification processing part 53 to the outside of an electric vehicle. The number of the sounding body 4 may be single or plural, and any mounting position from which an artificial engine sound is emitted to the outside of the vehicle may include forward, backward, left side, right side, and others.

Figure 30:
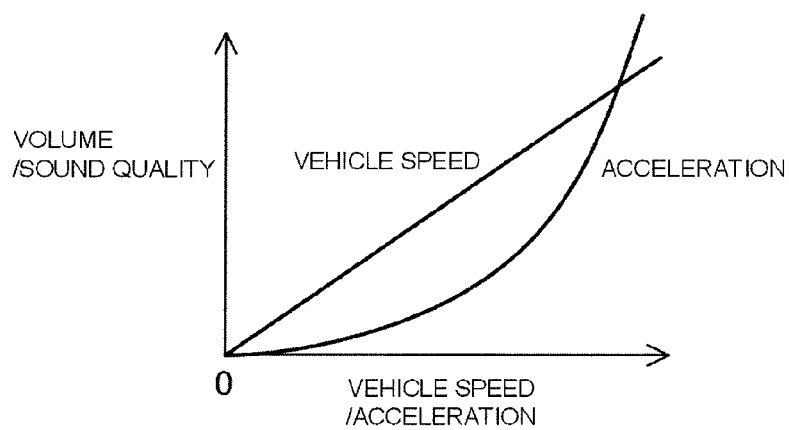
FIG. 30 is a diagrammatic view showing the concept of the characteristic of a volume modification part and of a sound quality modification part.

The control which is performed by the vehicle speed signal which is used in the Embodiment 4 may be changed to the control which is performed by the acceleration signal. In a case where a vehicle change signal is used, the volume and the sound quality is changed in proportion to the vehicle speed, however, in a case where an acceleration signal is used, as shown in FIG. 30, the volume and the sound quality may be changed with respect to the ratio of the squares of the acceleration. Further, switching operation may be performed between the vehicle speed signal and the acceleration signal. Switching operation between the vehicle speed signal and the acceleration signal may be performed by either of control of software or manual control of user such as switch, etc.

Figure 31:
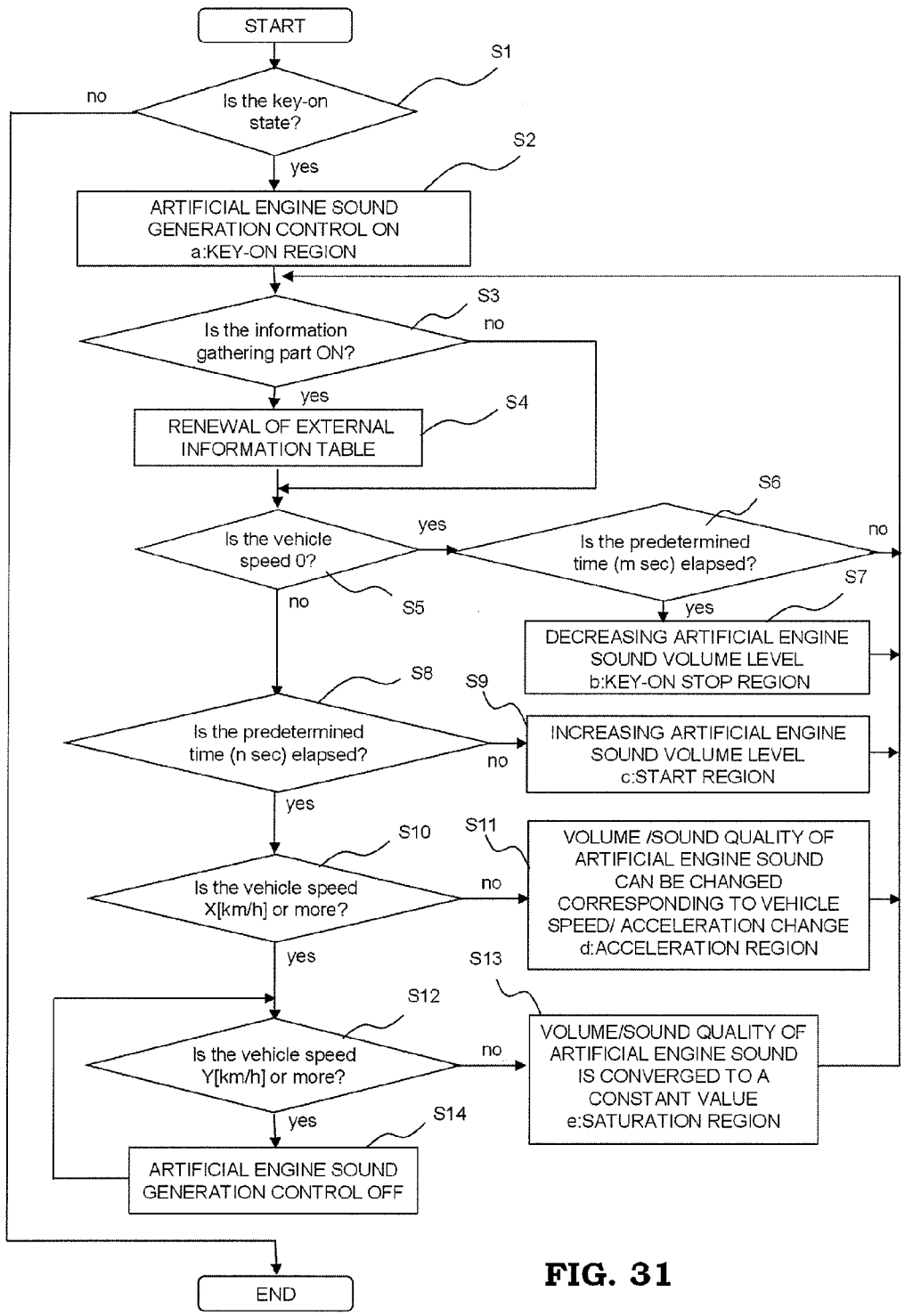
FIG. 31 is a flow chart showing the flow of the operation of an artificial engine sound control unit according to Embodiment 4 of the present invention.

FIG. 31 shows the flow of operation of the entire of artificial engine sound control unit 3 in Embodiment 4. When the key switch 7 is turned ON (S1), a speed region becomes the a:key-on region, and an artificial engine sound is generated (S2). In a case where the key switch 7 is the OFF-state, an artificial engine sound is not generated, and the system is ended.

In a case where the information gathering part 9 is turned ON (S3 yes), the table 52B of sound quality versus external information and the table 53C of volume versus external information are updated by the external information which is obtained by the information gathering part 9 (S4), and then determination whether the vehicle speed is 0 or not is made (S5). In a case where the information gathering part 9 is turned OFF (S3 no), the frequency amount change of the table 52B of sound quality versus external information and the amount of volume change of the table 53C of volume versus external information is not added in the sound quality modification part 52C and the volume level modification part 53D, and determination whether the vehicle is 0 or not is made (S5).

In a case where a vehicle speed signal is 0 (S5 yes), it is determined whether a predetermined time n[seconds] is elapsed or not (S6). In a case where a predetermined time n[seconds] is elapsed (S6 yes), the speed region determination part 6 determines such that the speed region is the b:key-on stop region (S7), and the volume level of an artificial engine sound is decreased, the flow returns to the ON/OFF judgment (S3) of the information gathering part 9. In a case where a predetermined time n[seconds] is not elapsed (S6 no), without any treatment, the flow returns to the ON/OFF judgment (S3) of the information gathering part 9. This n[seconds} is any time which is considered such that the state in which the electric vehicle is stopped is maintained.

In a case where a vehicle speed signal is not 0 (S5 no), it is determined whether a predetermined time m[seconds] is elapsed or not (S8). In a case where a predetermined time m[seconds] is not elapsed (S8 no), the speed region determination part 6 determines such that the speed region is the c:start region (S9), and the volume level of an artificial engine sound is increased, and the flow returns to the ON/OFF judgment (S3) of the information gathering part 9. In a case where a predetermined time m[seconds] is elapsed (S8 yes), it is determines whether the vehicle speed is X[km/h] or higher (S10). This m[second] at this time is any time which evokes such that the acceleration immediately after gasoline cars start to run.

In a case where a vehicle speed is not X[km/h] or higher (S10 no), the speed region determination part 6 determines such that a speed region is the d:acceleration region (S11), and the volume and the sound quality of an artificial engine sound is varied, and the flow returns to the ON/OFF judgment (S3) of the information gathering part 9. In a case where a vehicle speed is X[km/h] or higher (S10 yes), it is determines whether the vehicle speed is Y[km/h] or higher (S12). This X[km/h] is any minimum speed of an electric vehicle which is determined such that it is not necessary to increase the volume of the artificial engine sound or the volume of the artificial engine sound may be decreased because with increasing the running speed of the electric vehicle, the volume of running sound (such as wind noise or the road surface noise) other than the artificial engine sound becomes large.

In a case where a vehicle speed is not Y[km/h] or higher (S12 no), the speed region determination part 5 determines such that a speed region is the e:saturation region, (S13), and the volume and the sound quality of an artificial engine sound is converged to be a constant value, and the flow returns to the ON/OFF judgment (S3) of the device for collection of external information 9. In a case where a vehicle speed is Y[km/h] or higher (S12 yes), the generation control of an artificial engine sound is turned OFF (S14), then, it is determined whether the vehicle speed is Y[km/h] or higher again (S12). This Y[km/h] is, for example, 20 [km/h], which is any speed of electric vehicle, and it is determined such that it is not necessary to generate the artificial engine sound for the electric vehicle.

The processing in a case where the state in which an electric vehicle comes close to a start running mode is detected is preferentially performed by executing interruption processing to the above mentioned flow.

Embodiment 5

Figure 32:
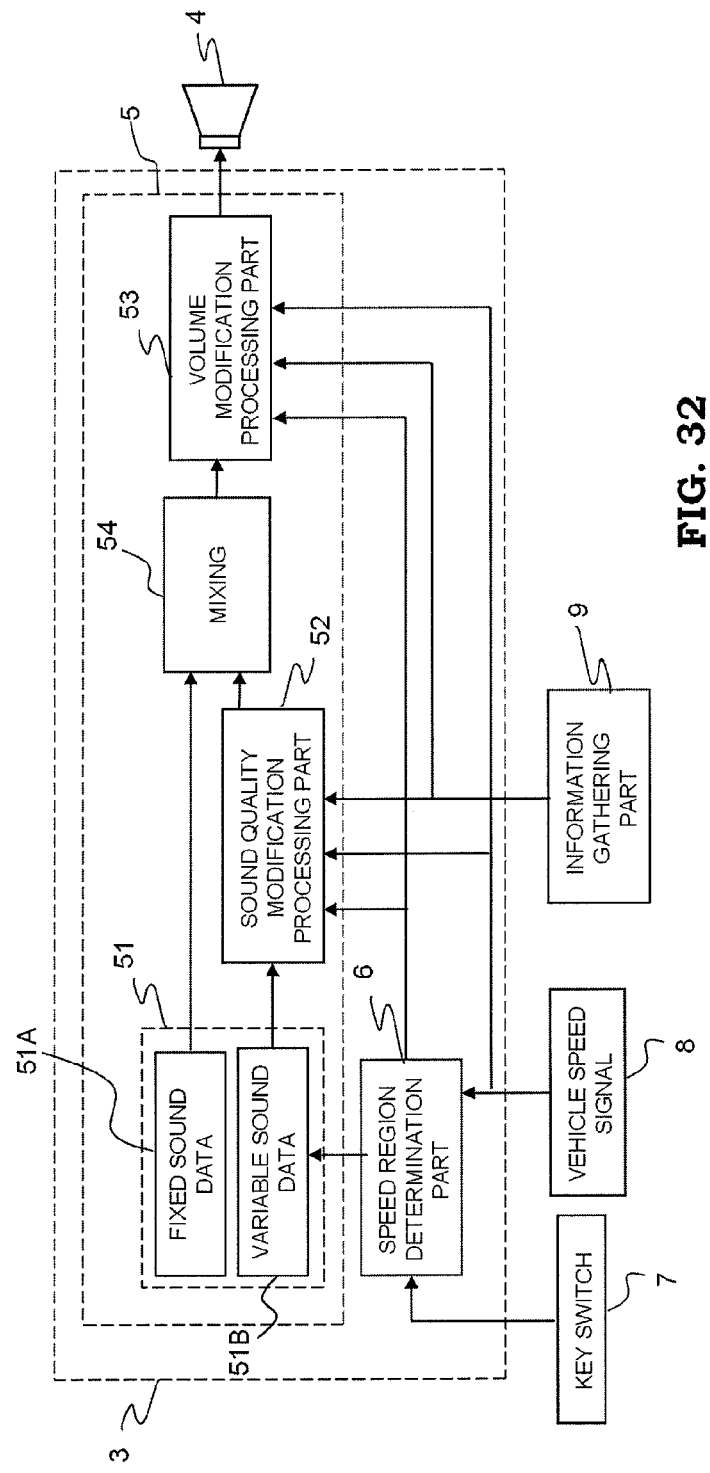
FIG. 32 is a block diagram showing the configuration of a main part of an artificial engine sound control unit according to Embodiment 5 of the present invention.

FIG. 32 is a block diagram showing the configuration of a main part of an artificial engine sound control unit according to Embodiment 5 of the present invention. In FIG. 32, the symbol which is same as that in FIG. 16 indicates the same part or the corresponding part. In EMBODIMENT 5, an artificial engine sound data 51 is divided into a fixed sound data 51A and a variable sound data 51B. The quality of the sound which is outputted from the variable sound data 51B is adjusted by a sound quality modification processing part 52. The sound whose quality is adjusted and the sound which is outputted from the fixed sound data 51A is mixed in a mixing 54, and the volume is adjusted by a volume modification processing part 53 where the volume is changed.

Figure 33:
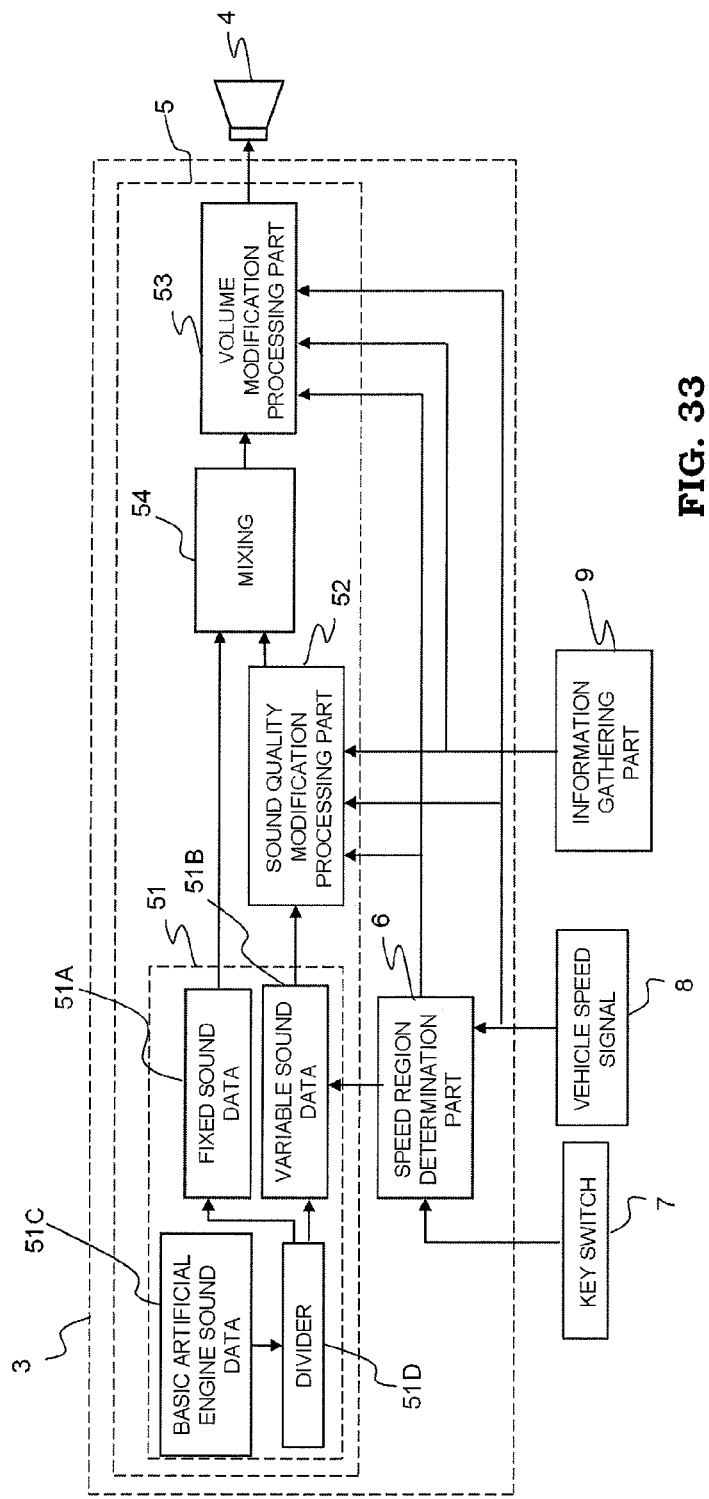
FIG. 33 is a block diagram showing another configuration of a main part of an artificial engine sound control unit according to Embodiment 5 of the present invention.

As shown in FIG. 33, the fixed sound data and the variable sound data may be produced by dividing the sound which is outputted by a basic artificial engine sound data 51C by a divider 51D into the fixed sound data 51A and the variable sound data 51B.

The fixed sound data 51A is a reference sound data which evokes the running of vehicle, whose sound quality is not changed by the vehicle speed and acceleration, or by external information, for example, the sound having lower frequency is the fixed sound data 51A. Further, it is preferable such that the fixed sound data 51A is a sound data having frequency component of a wide band such as white noise. The variable sound data 51B is a sound data, which evokes the running of vehicle, whose sound quality is adjusted so as to change by the sound quality modification processing part 52 corresponding to the vehicle speed and acceleration or external information. It is preferable such that the variable sound data 51B comprises frequency components having one or plural of peaks whose range is narrower than that of the fixed sound data 51A. Further, the variable sound data 51B may be a sinusoidal wave having one specific frequency or sinusoidal waves having plural specific frequencies. The sound data of this specific frequency includes basic frequency and high harmonic components of an engine sound. For example, in EMBODIMENT 4, when a vehicle speed is increased, the sound quality of the entire artificial engine sound is increased. Accordingly, low frequency components are removed; as a result, there is the tendency such that the engine sound becomes light. In EMBODIMENT 5, as the fixed sound data 51A and the variable sound data 51B processing is performed by dividing the sound into a sound data which does not change the sound quality and a sound data which changes the sound quality. Consequently, the engine sound which gives a feeling of high quality can be reproduced by changing the sound quality of the artificial engine sound corresponding to the increase of the vehicle speed and always including low frequency components.

In Embodiment 5, as shown in FIG. 32 and FIG. 33, the sound quality modification processing part 52 controls the sound quality of the variable sound data 51B to change. On the other hand, the sound quality of the fixed sound data 51A is not changed and is inputted to the mixing 54. The sound quality modification processing part 52 changes the sound of the variable sound data 51B for individual speed regions which are determined by the speed region determination part 6 based on the information obtained by the vehicle speed 8, the information gathering part 9 and the speed region determination part 6. The details of the sound quality modification processing part 52 are same as that of FIG. 13 described in Embodiment 3. The sound quality modification processing part 52 comprises a table 52A of sound quality versus vehicle speed, a table 52B of sound quality versus external information and a sound quality modification part 52C.

The operation of the sound quality modification processing part 52, in a case where the sound data of the variable sound data 51B is one specific frequency sound data, may be performed in the same way as that of the sound quality modification processing part 52 described in Embodiment 4 as follows. The table 52A of sound quality versus vehicle speed holds a table of amount of frequency change Fv[Hz] corresponding to the change of a vehicle speed, as shown in the table in FIG. 18. The characteristic example of the table 52A of sound quality versus vehicle speed is shown in FIG. 19. In the characteristic example shown in FIG. 19, the sound quality of an artificial engine sound which is inputted is not changed in the a:key-on region and the b:key-on stop region, when an electric vehicle is started to run, the sound quality of the artificial engine sound which is inputted is changed to a high frequency side corresponding to the increase of the vehicle speed. The table 52A of sound quality versus vehicle speed outputs the amount of frequency change Fv[Hz] according to an increase of vehicle speed to the sound quality processing part 52C by using the vehicle speed information which is obtained by the vehicle speed signal 8. Further, the above mentioned vehicle speed may be changed to the acceleration, and then the amount of frequency change Fv[Hv] may be outputted to the sound quality modification part 52C.

Figures 34, 35:
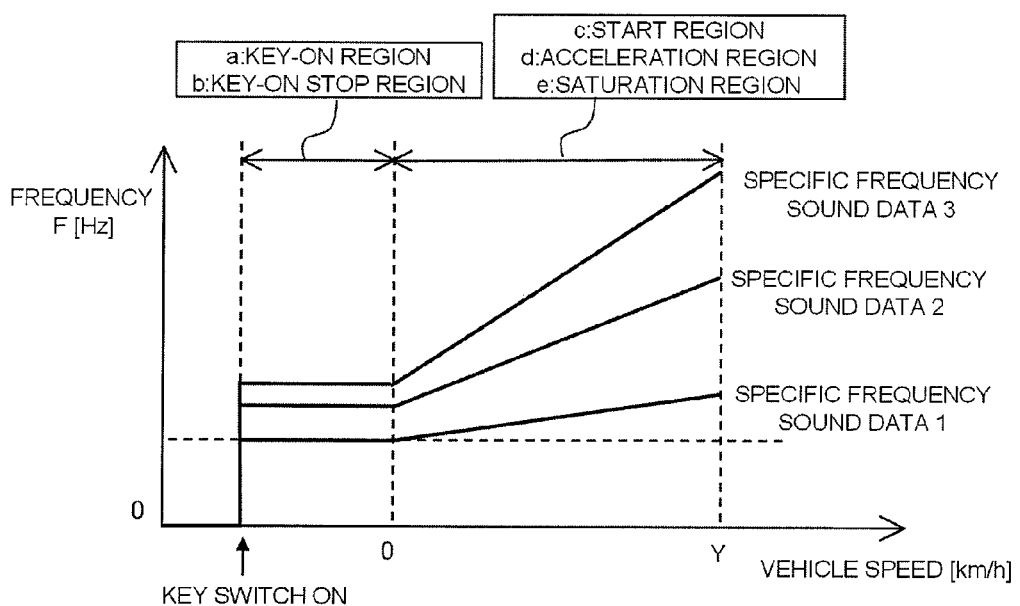
FIG. 34 is a table showing an example of a table of sound quality versus vehicle speed with respect to a sound quality modification part according to Embodiment 5 of the present invention.
FIG. 35 is a diagrammatic view showing an example of the characteristic of a table of sound quality versus vehicle speed with respect to a sound quality modification part according to Embodiment 5 of the present invention.

Further, in a case where the variable sound data 51B holds plural kinds of specific frequency sound data, the table 52A of sound quality versus vehicle speed is a table, for example, as shown in FIG. 34. The table 52A of sound quality versus vehicle speed holds amount of frequency change Fv[Hz] corresponding to the vehicle speed for individual specific frequency sound data 1, 2 and 3. The characteristic example of the table 52A of sound quality versus vehicle speed, in a case where the variable sound data 51B has plural specific frequency sound data will be shown in FIG. 35. In the characteristic example shown in FIG. 35, the sound quality of an artificial engine sound which is inputted is not changed in the stop state such as the a:key-on region and the b:key-on stop region, when an electric vehicle is started to run, the sound quality of the artificial engine sound which is inputted is changed to a high frequency side corresponding to the increase of the vehicle speed and is changed with different tilt for individual specific frequency sound data. The table 52A of sound quality versus vehicle speed outputs the amount of frequency change Fv[Hz] of plural specific frequency sound data according to an increase/decrease of vehicle speed to the sound quality processing part 52C by using the vehicle speed information which is obtained by the vehicle speed signal 8. Further, the above mentioned vehicle speed may be changed to the acceleration, and then the amount of frequency change Fv[Hv] may be outputted to the sound quality modification part 52C.

The table 52B of sound quality versus external information holds the sound amount of frequency change corresponding to noise information of vehicle external environment which is obtained by the information gathering part 9, information indicating the presence or absence of obstacles including pedestrians, bicycles, bikes, etc., information indicating the distance to the obstacles, and information indicating the presence time of the obstacles. For example, as shown in a table in FIG. 14, the table 52B of sound quality versus external information may hold the amount of frequency change Fext1 with respect to the presence time of an obstacle, the amount of frequency change Fext2 with respect to the distance of an obstacles, and the amount of frequency change Fext3 with respect to the level of noise in the vicinity. Further, the table 52B of sound quality versus external information may hold the amount of frequency change corresponding to the information indicating the state of a parking brake, a foot brake and a gear which is obtained by the information gathering part 9. For example, in a case where a speed region is the a:key-on region and the b:key-on stop region, the table 52B of sound quality versus external information, as a table shown in FIG. 15 which is described in Embodiment 3, may hold the amount of frequency change Fext4 with respect to the state of a parking brake, the amount of frequency change Fext5 with respect to the state of a foot brake, and the amount of frequency change Fext6 with respect to the state of a gear. On the other hand, as a table shown in FIG. 20 which is described in EMBODIMENT 4, in a case where a speed region is the c:start region, the d:acceleration region or the e:saturation region, the amount of frequency change Fext4 with respect to the amount of stepping on a foot brake may be held. Individual parameters indicated by Fext may have correlations each other or may be treated as an independent parameter. Further, numeral values shown in FIG. 14, FIG. 15 and FIG. 20 are example, and numeral values are not limited to these.

As above-mentioned, the frequency can be changed by information indicating the state of a damping brake (foot brake), a parking brake, a gear and an accelerator, etc. which is obtained by the information gathering part 9. Especially, by the above-mentioned information, the state in which an electric vehicle comes close to a start running mode can be detected, the sound quality can be changed by changing the frequency, and the state in which the electric vehicle which is stopped comes close to a start running mode can be informed to pedestrians, etc. so as to urge them to pay attention.

The table 52B of sound quality versus external information outputs Fext (=Fext1+Fext2+Fext3+ . . . ) [Hz] which is the total of amount of frequency change of individual external information to the sound quality modification part 52C. The table 52B of sound quality versus external information may hold the amount of frequency change with respect to other external information. Further, the amount of frequency change for individual speed regions may be held.

The sound quality modification part 52C obtains the amount of frequency change of the inputted artificial engine sound F[Hz] based on Fv[Hz] which is the total of the amount of frequency change which is outputted from the table 52A of sound quality versus vehicle speed and the amount of frequency change Fext[Hz] which is outputted from the table 52B of sound quality versus external information. The sound quality modification part 52C changes the frequency of the sound data which is inputted to the sound quality modification part 52 only by the amount of frequency change F[Hz]. As a method for changing the frequency, SRC (Sampling rate converter) may be used or FFT processing or pitch conversion may be used. By using the above-mentioned method, the sound quality of the artificial engine sound can be changed corresponding to the change of vehicle speed, acceleration and external information.

A mixing 54 shown in FIG. 32 and FIG. 33 mixes the fixed sound data 51A and one of or plural kinds of specific frequency sound data of the variable sound data 51B. After the band is mixed, the sound data which is processed is outputted to the volume modification processing part 53. The volume modification processing part 53 changes the volume of the artificial engine sound. The operation of the volume modification processing part 53 may be performed in the same way as that of the volume modification processing part 53 in Embodiment 4. The volume modification processing part 53 comprises a table 53A of volume versus vehicle speed, a table 53B of volume versus time, a table 53C of volume versus external information, and a volume modification part 53D. The volume modification processing part 53 controls the volume of an artificial engine sound to be different volumes for individual speed regions which are determined by the speed region determination part 6 based on the information obtained by the vehicle speed part 8, the information gathering part 9 and the speed region determination part 6.

The table 53A of volume versus vehicle speed, as shown in a table in FIG. 21, holds a table of a volume Pb[dB] which is a reference corresponding the change of a vehicle speed. The characteristic examples of the table 53A of volume versus vehicle speed are shown in FIG. 22, FIG. 23 and FIG. 24. In these characteristic examples, the volume of an artificial engine sound which is inputted to the a:key-on region and the b:key-on stop region is a constant value and is not changed. In the c:start region and the d:acceleration region, when an electric vehicle starts to run, the volume is increased corresponding to the increase of the vehicle speed. At this time, when the vehicle speed is increased, a tire sound is added to the vehicle noise. Therefore, as shown by a broken line in FIG. 22 and FIG. 23, the characteristic such that the volume is decreased corresponding to the increase of the vehicle speed may be acceptable. According to the characteristic, the effect such that the electric power stored in the battery can be increased is expected. In the e:saturation region, as shown in FIG. 22, the characteristic such that a constant value N_x[dB] is always outputted may be acceptable, or as shown in FIG. 23, the characteristic such that the value becomes gradually to N_y [dB] may be acceptable. Further, when the vehicle speed reaches the vehicle speed where the generation of an artificial engine sound is judged to be unnecessary, the characteristic such that the volume is gradually decreased before the vehicle speed reaches Y[km/h] where the generation of an artificial engine sound is unnecessary as shown in FIG. 24 may be acceptable. The table 53A of volume versus vehicle speed outputs the reference volume Pb[dB] with increasing of the vehicle speed to the volume modification part 53D by using the vehicle speed information which obtained by the vehicle speed signal 8. Further, the above mentioned vehicle speed may be changed to the acceleration, and then the reference volume Pb[dB] may be outputted to the volume modification part 53D.

As shown in a table shown in FIG. 25, the table 53B of volume versus time holds a table of the amount of volume change Pt[dB] corresponding to the change of time for individual speed regions. Here, the amount of volume change refers to the amount of change of a volume from the reference volume. FIG. 7, FIG. 8 and FIG. 9 show the characteristic examples of the table 53B of volume versus time in the a:key-on region and the b:key-on stop region. In the a:key-on region, when the key switch 7 is turned ON, an idling sound is generated. By the idling sound, it is necessary for pedestrians in the vicinity and a driver to recognize such that the key switch 7 is turned ON. Therefore, as shown in the characteristic example of FIG. 7, it is preferable such that a volume of an artificial engine sound is made to be slightly larger than the reference volume. Further, there is the possibility such that pedestrians, etc. are surprised by the situation in which the artificial engine sound is suddenly generated. Therefore, the volume of the artificial engine sound may be increased gradually as shown in FIG. 8. Or, as shown in FIG. 9, an artificial engine sound having a small volume may be generated at the beginning, and then, an artificial engine sound having a large volume may be generated. In the b:key-on stop region, in order to avoid the noise pollution of the artificial engine sound while electric vehicles are stopped, it is preferable such that the artificial engine sound has the characteristic in which the volume can be changed to be small.

The characteristic examples of the table 53B of volume versus time in the c:start region, the d:acceleration region and the e:saturation region are shown in FIG. 26, FIG. 27 and FIG. 28. A normal engine is accelerated when a vehicle starts to run, so, the running sound becomes large. Therefore, in the c:start region, the volume may be made to be larger than that of normal reference volume. For example as shown in FIG. 26, the characteristic such that the amount of volume change is always a constant value B so as to increase the volume may be acceptable. Or, the characteristic such that the amount of volume change is made to be large at the beginning as shown in FIG. 27 and then the amount of volume change is made to be small by every lapse of time may be acceptable. Further, when the volume suddenly becomes large, pedestrians in the vicinity of an electric vehicle will be surprised. Therefore, as shown in FIG. 28, the characteristic such that the amount of volume change is gradually increased and is gradually decreased after a time is lapsed to some extent may be acceptable. Further, in order to bring an artificial engine sound close to normal engine sound, the maximum amount of volume change A of an artificial engine sound in the e:key-on region as shown in FIG. 7, FIG. 8 and FIG. 9 is made to be smaller than the maximum amount of volume change B of an artificial engine sound in the c:start region as shown in FIG. 26, FIG. 27 and FIG. 28. The table 53B of volume versus time outputs the amount of volume change Pt[dB] corresponding to change of time for individual regions to the volume modification part 53D by using the speed region information which is obtained by the speed region determination part 6.

The table 53C of volume versus external information holds the amount of volume change corresponding to noise information of vehicle external environment which is obtained by the information gathering part 9, information indicating the presence or absence of obstacles including pedestrians, bicycles, bikes, etc., information indicating the distance to the obstacles, and information indicating the presence time of the obstacles. For example, as shown in a table in FIG. 10, which is described in Embodiment 2, the table 53C of volume versus external information may hold the amount of volume change Pext1 with respect to the presence time of an obstacle, the amount of volume change Pext2 with respect to the distance of an obstacles, and the amount of volume change Pext3 with respect to the level of noise in the vicinity. By using the above-mentioned amount of volume change, in a case where pedestrians stay for a long time in the vicinity of an electric vehicle or in the case where the distance between pedestrians and the electric vehicle is short, it is easier for pedestrians to perceive the presence of the electric vehicle. On the contrary, when it is determined such that pedestrians perceive the presence of an electric vehicle, the volume may be decreased so as not to cause discomfort to others in the vicinity.

Further, the table 53C of volume versus external information may hold the volume amount corresponding to the information indicating the state of a damping brake (foot brake), a parking brake, a gear and an accelerator which is obtained by the information gathering part 9. For example, in a case where a speed region is the a:key-on region and the b:key-on stop region, as shown in a table in FIG. 11, which is described in Embodiment 2, the table 53C of volume versus external information may hold the amount of volume change Pext4 with respect to the state of a parking brake, the amount of volume change Pext5 with respect to the state of a foot brake, the amount of volume change Pext6 with respect to the state of a gear and the amount of volume change Pext7 with respect to an accelerator pedal position. On the other hand in a case of a speed region is the c:start region, the d:acceleration region or the e:saturation region, the amount of volume change Pext5 with respect to the brake pedal position may be held as shown in a table in FIG. 29. The table 53C of volume versus external information outputs Pext (=Pext1+Pext2+Pext3+ . . . ) [dB] which is the total of amount of volume change of individual external information to the volume modification part 53D. The table 53C of volume versus external information may hold the amount of volume change with respect to other external information. Further, the amount of volume change for individual speed regions may be held. Individual parameters indicated by Pext may have correlations each other or may be treated as an independent parameter. Further, numeral values shown in FIG. 10, FIG. 11 and FIG. 29 are example, and numeral values are not limited to these.

Further, as a broken line in FIG. 7 and FIG. 8, the state in which an electric vehicle comes close to a start running mode is detected, and then, in order to urge pedestrians, etc. in the vicinity of the electric vehicle to pay attention, the volume may be increased at the time when a parking brake is turned OFF. The state in which an electric vehicle comes close to a start running mode can be detected by the information indicating the state of a damping brake (food brake), a parking brake, or a gear which is obtained by the information gathering part 9. For example, the state in which an electric vehicle comes close to a start running mode can be detected not only by the above-mentioned parking brake state but also by the state in which a brake (both of the food brake and the parking brake, or either of them) is changed from the ON-state to the OFF-state. Or the state in which a vehicle comes close to a start running mode may be detected by the state in which a key switch is switched from an accessory position to an ignition (capable of driving a motor) position, the state in which a position of a gear is changed, or in the state of capable of driving a motor, an accelerator pedal is pressed on. Based on the above-mentioned, the modification of the volume modification processing part 53 including the silent state may be performed.

The volume modification part 53D adds the amount of volume change Pt[dB] which is outputted from the table 53B of volume versus time and the amount of volume change Pext[dB] which is outputted from the table 53C of volume versus external information to the reference volume Pb[dB] which is outputted from the table 53A of volume versus vehicle speed so as to make the volume P[dB] of the artificial engine sound to be outputted. The volume level modification part 53D controls the level of an input sound data to be the volume P[dB]. By using the above-mentioned methods, the volume of the artificial engine sound which is emitted from the outside of an electric vehicle can be changed corresponding to the vehicle speed, the acceleration and the external information.

Especially, by the information indicating the state of a damping brake (foot brake), a parking brake, a gear and an accelerator, etc. which is obtained by the information gathering part 9, the state in which an electric vehicle comes close to a start running mode can be detected, the sound quality can be changed by changing the frequency, and the state in which the electric vehicle which is stopped comes close to a start running mode can be informed to pedestrians, etc. so as to urge them to pay attention. In Embodiment 5, in addition to the volume, the sound quality can be changed by detecting the state in which an electric vehicle comes close to a start running mode, the state in which the electric vehicle which is stopped comes close to a start running mode can be informed to pedestrians, etc. more clearly so as to urge them to pay more attention. Further, the information which is obtained by the information gathering part 9 is given not only to the volume the volume modification processing part but also to the sound quality modification processing part. That is, when the state in which an electric vehicle comes close to a start running mode is detected, a feeling of strangeness is brought to passengers in the vicinity by changing the frequency of the artificial engine sound to the frequency which is disagreeable to the ear (for example, 1-2 kHz, etc.) or by increasing the volume, or by making the volume to be 0 to make the silent state. In doing so, various kinds of methods such as adjusting either of the sound quality or the volume or both of them may be acceptable.

That is, without departing from the spirit and the scope of the present invention, embodiments may be combined without limitation, further, in the embodiments, the details of construction may be changed or added, or may be selected as necessary, or amended embodiments may be combined.

Remarks
1: electric vehicle
2: approaching vehicle audible system
3: artificial engine sound control unit
4: sounding body
5: artificial engine sound generating part
6: speed region determination part
7: key switch
8: vehicle speed signal
9: information gathering part
51: artificial engine sound data
51A: fixed sound data
51B: variable sound data
52: sound quality modification processing part
53: volume modification processing part

The invention claimed is:

1. An artificial engine sound control unit which controls an artificial engine sound which is emitted from a sounding body, which is provided at an electric vehicle whose at least a part of drive power is generated by an electric motor, to outside, comprising:
a speed region determination part which determines a speed region of the electric vehicle; and
an artificial engine sound generating part comprises a volume modification processing part which controls the volume of the artificial engine sound, wherein
when the speed region determination part determines such that the electric motor of the electric vehicle can be energized and the electric vehicle is stopped, the artificial engine sound generating part controls so as for the sounding body to emit the artificial engine sound, and wherein
the artificial engine sound generating part is configured to detect that the electric vehicle is in a state that is immediately prior to a start running mode, and based on the detection that the electric vehicle is in a state that is immediately prior to the start running mode, the volume modification processing part changes a volume of the artificial engine sound which is emitted from the sounding body in the stop state of the electric vehicle.

2. The artificial engine sound control unit according to claim 1, wherein the state that is immediately prior to a start running mode is detected based on the change of the state of a brake, that is, from on state to off state.

3. The artificial engine sound control unit according to claim 2, wherein the brake is a parking brake.

4. The artificial engine sound control unit according to claim 1, wherein the artificial engine sound generating part comprises a sound quality modification processing part which controls the sound quality of the artificial engine sound which is emitted from the sounding body.

5. The artificial engine sound control unit according to claim 4, wherein the sound quality modification processing part controls the sound quality of the artificial engine sound corresponding to the state of a brake or a gear of the electric vehicle.

6. The artificial engine sound control unit according to claim 4, wherein the sound quality modification processing part controls the quality of the artificial engine sound corresponding to noise level in the vicinity of the electric vehicle, or information indicating an obstacle.

7. The artificial engine sound control unit according to claim 4, wherein even when the speed region determination part determines such that the electric vehicle is in the running state, the artificial engine sound generating part controls so as for the sounding body to emit the artificial engine sound, and the sound quality modification processing part controls the sound quality of the artificial engine sound corresponding to the information indicating the speed region of the electric vehicle which is determined by the speed region determination part.

8. The artificial engine sound control unit according to claim 7, wherein the sound quality modification processing part controls the sound quality of the artificial engine sound when the electric vehicle is determined to be in the stop state by the speed region determination part to be lower frequency than that when the electric vehicle is determined to be in the running state by the speed region determination part.

9. The artificial engine sound control unit according to claim 4, wherein the artificial engine sound generating part comprises fixed sound data and variable sound data as artificial engine sound data, and the sound quality modification processing part controls the sound quality of the variable sound data corresponding to the speed region which is determined by the speed region determination part.

10. The artificial engine sound control unit according to claim 9, wherein the fixed sound data are sound data having frequency component of a wide band, and the variable sound data are sound data comprising frequency component having one or plural peaks whose range is narrower than that of the fixed sound data.

11. The artificial engine sound control unit according to claim 1, wherein the volume modification processing part controls to decrease the volume of the artificial engine sound or stop the artificial engine sound when the stop state of the electric vehicle is continued for longer than a predetermined time.

12. The artificial engine sound control unit according to claim 1, wherein the volume modification processing part controls the volume of the artificial engine sound corresponding to the state of a brake, a gear or an accelerator of the electric vehicle.

13. The artificial engine sound control unit according to claim 1, wherein the volume modification processing part controls the volume of the artificial engine sound corresponding to noise level in the vicinity of the electric vehicle, or information indicating an obstacle.

14. The artificial engine sound control unit according to claim 1, wherein even when the speed region determination part determines such that the electric vehicle is in the running state, the artificial engine sound generating part controls so as for the sounding body to emit the artificial engine sound, and the volume modification processing part controls the volume of the artificial engine sound corresponding to the information indicating the speed region of the electric vehicle which is determined by the speed region determination part.

15. The artificial engine sound control unit according to claim 14, wherein the volume modification processing part controls the volume of the artificial engine sound when the electric vehicle is determined to be in the stop state by the speed region determination part to be smaller than that when the electric vehicle is determined to be in the running state by the speed region determination part.

16. An approaching vehicle audible system comprising the artificial engine sound control unit as in claim 1 and a sounding body which is controlled by artificial engine sound control unit to emit a sound to the outside.

17. An electric vehicle having the approaching vehicle audible system claimed by claim 16.

* * * * *